(12) United States Patent
Miyata et al.

(10) Patent No.: US 7,787,707 B2
(45) Date of Patent: Aug. 31, 2010

(54) IMAGE-PROCESSING DEVICE PERFORMING IMAGE PROCESS ON RASTER IMAGE DATA IN RESPONSE TO RECEIVED SPECIFIC CODE

(75) Inventors: Yuji Miyata, Nishikasugai-gun (JP); Kenichi Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1394 days.

(21) Appl. No.: 11/200,127

(22) Filed: Aug. 10, 2005

(65) Prior Publication Data

US 2006/0033940 A1 Feb. 16, 2006

(30) Foreign Application Priority Data

Aug. 10, 2004 (JP) ............................. 2004-233434

(51) Int. Cl.
*G06K 9/36* (2006.01)
*G09G 5/37* (2006.01)
(52) U.S. Cl. ........................................ 382/276; 345/562
(58) Field of Classification Search ................. 382/284
See application file for complete search history.

(56) References Cited

U.S. PATENT DOCUMENTS

| | | | | |
|---|---|---|---|---|
| 5,262,767 A * | 11/1993 | Takeda | ...................... | 345/440 |
| 5,644,758 A * | 7/1997 | Patrick et al. | ................ | 345/562 |
| 5,717,845 A * | 2/1998 | Patrick et al. | ................ | 345/676 |
| 5,892,890 A * | 4/1999 | Clouthier et al. | .............. | 358/1.4 |
| 6,091,418 A * | 7/2000 | Smith et al. | .................. | 345/418 |
| 6,184,860 B1 * | 2/2001 | Yamakawa | ................... | 715/823 |
| 6,456,298 B1 * | 9/2002 | Kunimasa et al. | ........... | 345/629 |
| 6,597,364 B1 * | 7/2003 | Chiu et al. | .................... | 345/562 |
| 6,630,936 B1 * | 10/2003 | Langendorf | .................. | 345/562 |
| 2003/0048427 A1 * | 3/2003 | Fernandez et al. | ............. | 355/53 |
| 2003/0202212 A1 * | 10/2003 | Burgess et al. | ............. | 358/1.18 |
| 2004/0090194 A1 * | 5/2004 | Gesley | ........................ | 315/500 |
| 2005/0116955 A1 * | 6/2005 | Cao | ............................ | 345/441 |

FOREIGN PATENT DOCUMENTS

JP 2003-331297 11/2003

* cited by examiner

*Primary Examiner*—Bhavesh M Mehta
*Assistant Examiner*—David P Rashid
(74) *Attorney, Agent, or Firm*—Banner & Witcoff, Ltd.

(57) ABSTRACT

Image-processing device for ROP is disclosed. Upon receiving a ROP command, the image-processing device determines whether the size of the brush data is required to be modified through a size modifying operation, based on the printing resolution of the printing device. If the size modifying operation is necessary, the image-processing device performs a process to enlarge or reduce the brush data, depending on the printing resolution. The image-processing device converts the ROP code associated with the operational expression using brush data to a combination of ROP codes associated with operational expressions using the source bitmap, but not brush data. The image-processing device controls a ROP processor to perform the ROP processes corresponding to these ROP codes using the enlarged or reduced brush data as the source bitmap in order to implement a ROP process equivalent to the ROP code inputted with the ROP command.

19 Claims, 16 Drawing Sheets

FIG.4

(CONVERSION TABLE)

| CONVERSION SOURCE CODE | CONVERSION PROCEDURE DATA |
|---|---|
| e9 | ... |
| ... | ... |
| ... | ... |

(CONVERSION PROCEDURE DATA)

| PROCESS SEQUENCE CODE NM | SOURCE DATA | CONVERSION DESTINATION DATA |
|---|---|---|
| 1 | ORIGINAL SOURCE BITMAP | 77 |
| 2 | BRUSH DATA | 88 |
| 3 | ORIGINAL SOURCE BITMAP | 66 |
| 4 (NM_max) | ORIGINAL DESTINATION BITMAP | 99 |

FIG.17

(CONVERSION PROCEDURE DATA FOR ROP CODE "e9")

| PROCESS SEQUENCE CODE NM(NM1) | SOURCE DATA | CONVERSION DESTINATION CODE |
|---|---|---|
| 1 | ORIGINAL SOURCE BITMAP | 77 |
| 2 | BRUSH DATA | 88 |
| 3 | ORIGINAL SOURCE BITMAP | 66 |
| 4 (NM_max1) | ORIGINAL DESTINATION BITMAP | 99 |

(CONVERSION PROCEDURE DATA FOR ROP CODE "58")

| PROCESS SEQUENCE CODE NM(NM0) | SOURCE DATA | CONVERSION DESTINATION CODE |
|---|---|---|
| 1 | BRUSH DATA | cc |
| 2 | ORIGINAL SOURCE BITMAP | ee |
| 3 | ORIGINAL DESTINATION BITMAP | 88 |
| 4 (NM_max0) | BRUSH DATA | 66 |

ROP CONVERSION PROCESS

CONVERSION OF ROP CODE "58e9"

| CN1 | CN0 | SOURCE DATA | GENERATED CODE |
|---|---|---|---|
| 1 | 1 | ORIGINAL SOURCE BITMAP | aa77 |
| 2 | 1 | BRUSH DATA | cc88 |
| 3 | 2 | ORIGINAL SOURCE BITMAP | ee66 |
| 4 | 3 | ORIGINAL DESTINATION BITMAP | 8899 |
| 5 | 4 | BRUSH DATA | 66aa |

IMAGE-PROCESSING DEVICE PERFORMING IMAGE PROCESS ON RASTER IMAGE DATA IN RESPONSE TO RECEIVED SPECIFIC CODE

BACKGROUND OF THE INVENTION

1. Technical Field

The present invention relates to an image-processing device and a computer program for the image-processing device configured to execute a plurality of types of image processes, whereby the image-processing device receives a specific code for an image process and performs the image process corresponding to the specific code on raster image data to be subjected to image processing.

2. Related Art

One image-processing device known in the art is a data-processing device that operates under WINDOWS (registered trademark) or another operating system. This type of data-processing device performs raster operation (ROP) processes in order to draw two or more raster images superimposed over each other. Specifically, the data-processing device performs ROP processes to perform logic operations corresponding to a ROP code using the source data and the destination raster image data, thereby executing image processes on destination raster image data based on source data. Here, source data is raster image data provided for the image process (ROP process). More specifically, the source data denotes data submitted into operands used for operational expressions (logic operations).

The ROP code is an integer specifying an image process. The data-processing device implements a plurality of types of image processes corresponding to the number of ROP codes. Hence, upon receiving a ROP code, this type of data-processing device executes an image process corresponding to the ROP code by performing logic operations corresponding to the ROP code, using the destination raster image data and source data.

A plurality of standards exists for ROP processes, including ROP2, ROP3, and ROP4. In a ROP process according to the ROP3 standard, for example, an image process corresponding to the ROP code is implemented by performing logic operations using two types of source data and the destination raster image data.

More specifically, in a ROP process according to the ROP3 standard, an image process is executed on the raster image data targeted for processing (destination bitmap) using brush data configured of raster image data of a standard size and a source bitmap configured of raster image data of an arbitrary size as the source data.

In a ROP process using the source bitmap, an image process corresponding to the ROP code is performed on a region of the destination bitmap having the same size as the source bitmap by performing logic operations on the region using the source bitmap.

In a ROP process using brush data, on the other hand, the image process corresponding to the ROP code is executed on a region of the destination bitmap targeted for image processing by performing logic operations using brush data on sections of the target region having a standard size, thereby forming a pattern in the destination bitmap. ROP process using brush data are used for achieving a brush effect (a filled-in effect).

Data that has undergone such a ROP process is inputted into an image-forming device, such as a printing device, for image formation (printing). If the data inputted into the image-forming device underwent a ROP process using brush data, in some cases the resolution of the resulting image is too high or the pattern generated by the brush data is rendered very small, depending on the type of image-forming device. As shown in FIG. 18, a brush drawing results from drawing an image based on raster image data that has undergone a ROP process using the same brush data when using an image-forming device having a low drawing capacity (a low printing resolution) and an image-forming device having a high drawing capacity (a high printing resolution).

This phenomenon occurs because the drawing capacity (printing resolution) of the image-forming device differs according to the device, even though the brush data has been standardized at a fixed size. When the image-forming device has a high drawing capacity, the dot density of the image formed on the image-forming member is high. Hence, when patterns are formed in sections of a standard size (standard number of dots), the patterns are rendered in miniature on the image-forming member.

In order to overcome this problem, Japanese patent application publication No. 2003-331297 discloses a method of enlarging the pattern virtually by modifying the dot pattern according to the printing resolution while maintaining the dot pattern of the brush data at the same size (standard size).

However, in some cases it is difficult to enlarge the pattern with the conventional method described above, depending on the type of pattern, such as complex dot patterns. Further, with image-forming devices having a high resolution, it has been difficult to take sufficient measures to avoid the phenomenon of the pattern being rendered too small. Further, since ROP processes are not considered in this conventional method, it may be difficult to adequately enlarge and render patterns using the technique described above, depending on the content of the ROP process.

SUMMARY

In view of the foregoing, a main object of the present invention is to provide an image-processing device that forms patterns without limiting the raster image to be drawn to a standard size.

Another object of the present invention is to provide an image-processing device that forms patterns suited to the drawing capacity of an image-forming device in the raster image to be drawn.

The present invention provides an image-processing device having: a raster operation unit, a size modifying unit, a combination deriving unit, and a processing unit. The raster operation unit receives a first type of command, sets source data to raster image data having arbitrary size in response to the first type of command, and executes a first image process corresponding to the received first type of command on target raster image data. The raster operation unit receives a second type of command different from the first type, sets the source data to pattern image data having a specific size in response to the second command, and executes a second image process corresponding to the received second type of command on the target raster image data on the specific size of the pattern image data basis. Accordingly, the raster operation unit generates a pattern on the target raster image data. The size modifying unit determines modifying the specific size of the pattern image data. The combination deriving unit derives a combination of the first type of command capable of implementing a target image process equivalent to the second image process. The processing unit sends the combination of the first type of command to the raster operation unit, and sets the source data to the pattern image data subjected by the size modifying unit, thereby instructing the raster operation unit to execute the target image process on the target raster image data.

The present invention provides an image-processing device having: a raster operation unit, a determining unit, a size modifying unit, a combination deriving unit, and a processing unit. The raster operation unit receives a first type of command, sets source data to raster image data having arbitrary size in response to the first type of command, and executes a first image process corresponding to the received first type of command on target raster image data. The raster operation unit receives a second type of command different from the first type of command, sets the source data to pattern image data having a specific size in response to the second command, and executes a second image process corresponding to the received second type of command on the target raster image data on the specific size of the pattern image data basis, thereby generating a pattern on the target raster image data. The determining unit determines whether the pattern image data is required to modify the prescribed size on receiving the second type of command. The size modifying unit performs one of an enlarging process and a reducing process on the pattern image data if the determining unit determines, that the pattern image data is required to modify the prescribed size. The combination deriving unit derives a combination of the first type of command capable of implementing a target image process equivalent to the second image process if the determining unit determines that the pattern image data is required to modify the prescribed size. The processing unit sends the received second type of command to the raster operation unit to execute the second image process if the determining unit determines that the pattern image data is not required to modify the prescribed size. The processing unit sends the combination of the first type of command to the raster operation unit, sets the source data to the pattern image data processed by the size modifying unit, and instructs the raster operation unit to execute the target image process on the target raster image data if the determining unit determines that the pattern image data is required to modify the prescribed size.

BRIEF DESCRIPTION OF THE DRAWINGS

The above and other objects, features, and advantages of the invention will become more apparent from reading the following description of the preferred embodiments taken in connection with the accompanying drawings in which:

FIG. 4 is an explanatory diagram showing the conversion table 55a and using ROP code "e9" of the ROP3 specification as an example;

FIG. 17 is an explanatory diagram illustrating a procedure for converting the ROP code "58e9" of the ROP4 standard.

DESCRIPTION OF THE EMBODIMENT

Next, preferred embodiments of the present invention will be described while referring to the accompanying drawings.

First Embodiment

Figure 1:
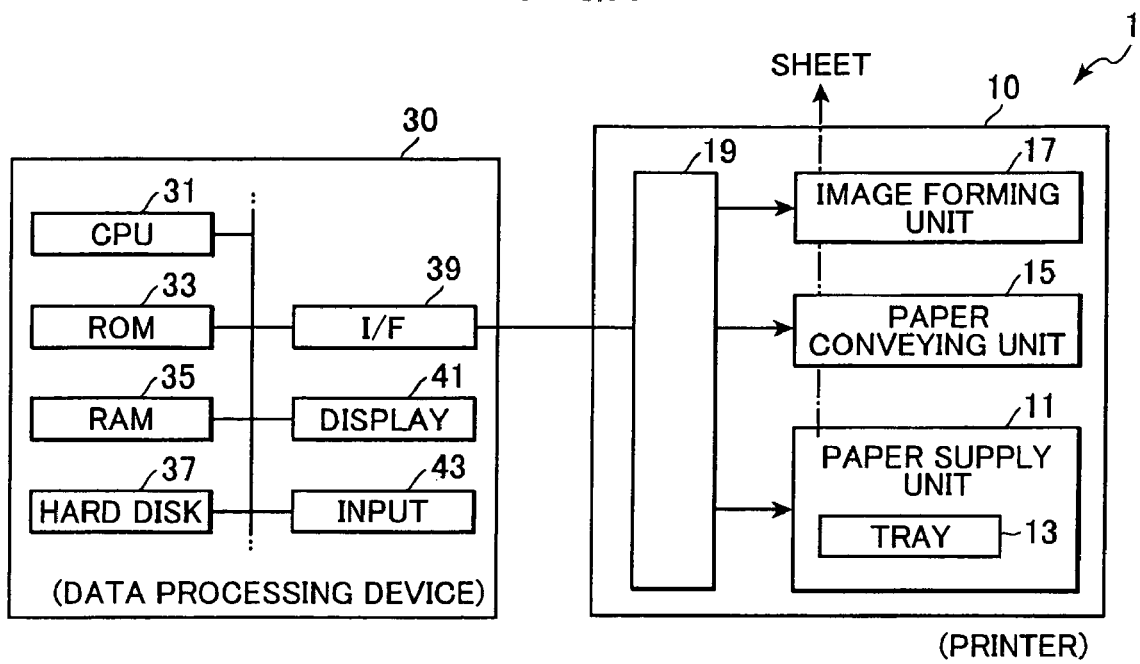
FIG. 1 is a block diagram showing the structure of an image-forming system 1 according to the present invention.

Referring to FIG. 1, an image-forming system 1 includes a printer 10, and a data processing device 30 that is connected to and capable of communicating with the printer 10.

The printer 10 has an identical structure to an inkjet printer, a laser printer, or another printer well known in the art. The printer 10 primarily includes a paper supply unit 11, a paper-conveying unit 15, an image-forming unit 17, and a control unit 19 for controlling all components in the printer 10. The paper supply unit 11 includes a paper tray 13 for accommodating a stack of paper rectangular in shape and cut to A4 size. The paper supply unit 11 extracts the topmost sheet of paper from the paper stacked in the paper tray 13 and conveys the sheet of paper in a prescribed direction to the paper-conveying unit 15.

The paper-conveying unit 15 conveys the paper received from the paper supply unit 11 to an image-forming position. Under control of the control unit 19, the image-forming unit 17 forms an image on the paper at the image-forming position based on image data inputted from the data processing device 30 (input image data). If the printer 10 is an inkjet printer, the image-forming unit 17 scans a recording head (not shown) by lines extending in a direction orthogonal to the paper-conveying direction, while the recording head ejects ink, thereby forming an image on the paper line-by-line at the image-forming position based on prescribed image input data for each line.

If the printer 10 is a laser printer, the image-forming unit 17 includes an image-carrying member for carrying a toner image, and a transfer member for transferring the toner image carried on the image-carrying member to the paper by an electrostatic force as the paper passes the image-forming position at the contact point between the image-carrying member and the transfer member, thereby forming an image on the paper. In this way, an image is gradually formed on the paper in the paper-conveying direction. After image-formation is completed, the paper is discharged onto a discharge tray (not shown).

The control unit 19 controls all components described above in the printer 10. The control unit 19 is connected to and capable of communicating with the data processing device 30 and controls the image-forming unit 17 to form images on the paper based on image data received from the data processing device 30.

The data processing device 30 includes a CPU 31 for performing various computations, a ROM 33 for storing various programs, a RAM 35 used by the CPU 31 as a work area when executing programs, a hard disk drive 37 for storing various data and application programs, an interface 39 for connecting the data processing device 30 to the printer 10 to achieve bidirectional communications therebetween, a display unit 41 configured of a liquid crystal display for displaying various data, and an input unit 43 configured of a keyboard, pointing device, and the like.

Figure 2:
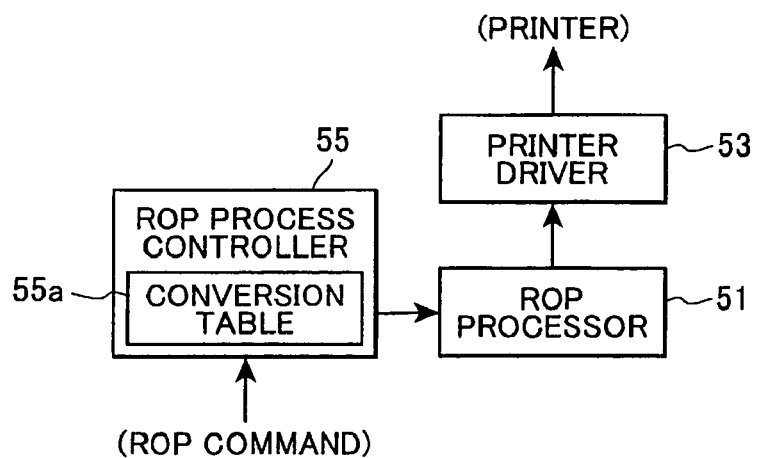
FIG. 2 is a block diagram showing functions that the CPU 31 implements in the data processing device by executing the various programs.

As shown in FIG. 2, the data processing device 30 functions as a raster operation (ROP) processor 51, a printer driver 53, and an ROP process controller 55 according to the various programs executed by the CPU 31.

The ROP processor 51 is capable of executing various image processes (ROP processes) based on ROP codes. ROP codes are designated integers for image processes. In the preferred embodiment, the ROP processor 51 executes ROP processes supported by the WINDOWS (registered trademark) graphics device interface (GDI), but it should be noted that the ROP processor 51 is not limited to this configuration.

Next, a brief description will be given for the configuration of the ROP processor 51 conforming to the ROP3 standard in WINDOWS (registered trademark).

The ROP processor 51 stores correlations between ROP codes and operational expressions (logic operations) for all ROP codes between "00" and "ff" (hexadecimal). Upon receiving an inputted ROP code, the ROP processor 51 selects an operational expression corresponding to the ROP code from 256 operational expressions. The ROP processor 51 combines brush data, a source bitmap, and a destination bitmap according to the operational expression indicated by the ROP code and applies this combination result to the destination bitmap.

By reflecting the results of the operation in the destination bitmap in this way, the ROP processor 51 performs an image process on the destination bitmap corresponding to the inputted ROP code.

Brush data is raster image data of a standard size. When the inputted ROP code corresponds to a ROP process using this brush data, the ROP processor 51 uses the brush data to execute the logic operation indicated by the ROP code on other raster image data (destination bitmap) provided for the ROP process. The logic operation is performed on a region of the raster image data targeted for image processing and is executed for each division of this targeted region having a standard size. As a result, a pattern is formed in the destination bitmap.

The source bitmap, on the other hand, is raster image data of an arbitrary size. When the inputted ROP code indicates a ROP process that uses this source bitmap, the ROP processor 51 uses the source bitmap when executing the logic operation indicated by the ROP code on the other raster image data provided for the ROP process. The logic operation is performed on a region of the other raster image data (destination bitmap) identical in size to the source bitmap. In this way, the ROP processor 51 performs an image process on the destination bitmap based on the source bitmap. Unlike the logic operations using brush data, the image process is not executed consecutively for each division of the target area in logic operations using the source bitmap, because the brush data is used for forming patterns in the destination bitmap, while the source bitmap is not.

Figure 3:
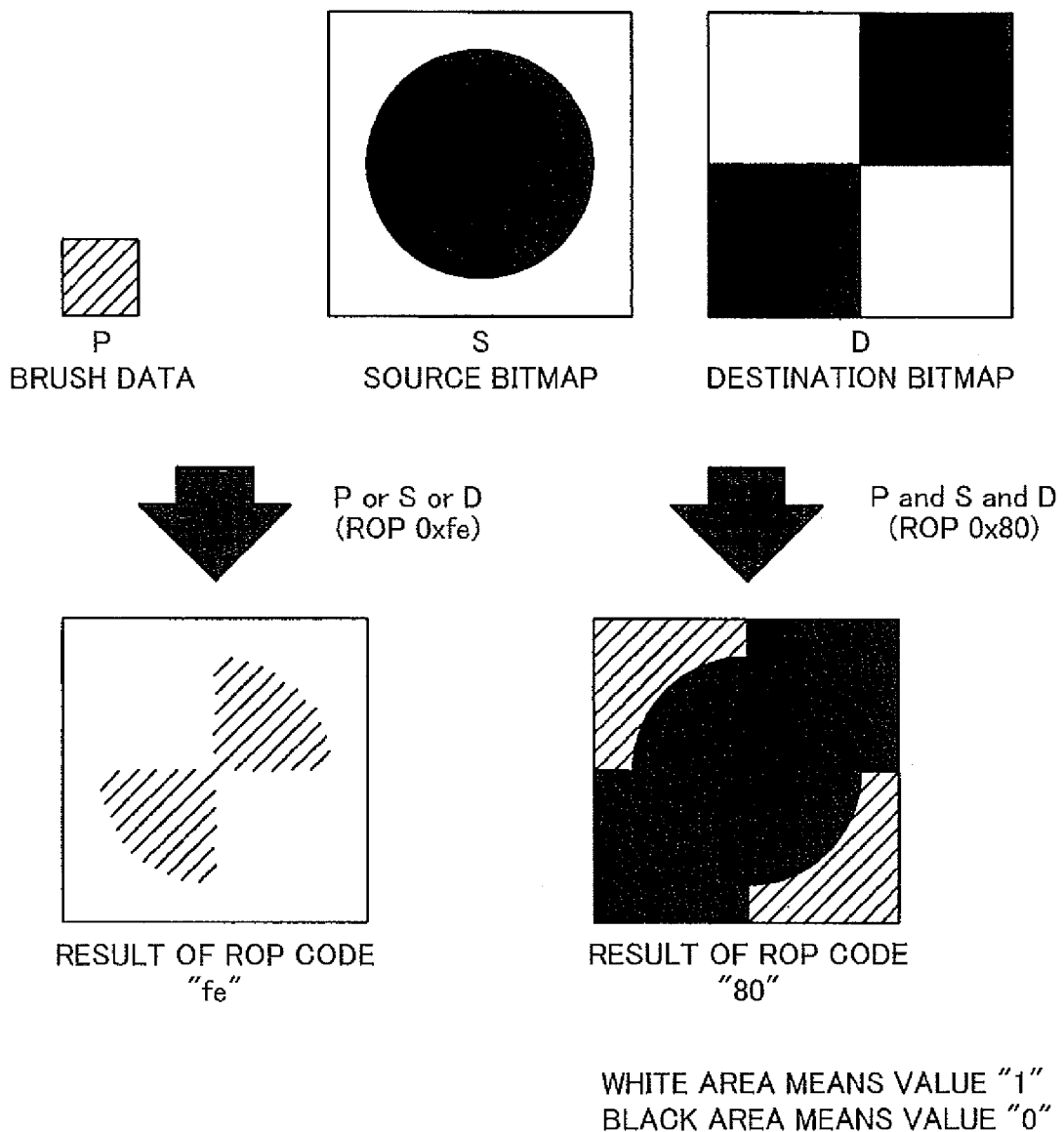
FIG. 3 is an explanatory diagram showing an example ROP process executed by the ROP processor.

The ROP processor 51 also performs a logic operation using the brush data while simultaneously performing a logic operation using the source bitmap. When the inputted ROP code indicates a ROP process that uses the brush data, source bitmap, and destination bitmap, the ROP processor 51 executes an image process on the destination bitmap using brush data as source data and an image process using the source bitmap as source data. As shown in FIG. 3, this example shows the results of performing ROP processes corresponding to ROP codes "fe" and "80" according to the ROP3 standard.

After the ROP processor 51 has performed the ROP process based on the ROP code inputted into the ROP process controller 55 to generate image data (destination bitmap), the printer driver 53 converts the image data into input image data (control signals) for the printer 10 and sends this input image data into the printer 10. The printer 10 executes an image-forming process (printing process) based on the input image data received from the printer driver 53 to form a raster image on paper supplied from the paper supply unit 11 based on the input image data.

In addition, the ROP process controller 55 also instructs the ROP processor 51 to execute an image process corresponding to a ROP code inputted from an external task. When the inputted ROP code is associated with an operational expression that does not use the brush data, the ROP process controller 55 instructs the ROP processor 51 to execute the ROP process (logic operation) corresponding to this ROP code.

When the inputted ROP code is associated with an operational expression that uses brush data, the ROP process controller 55 enlarges or reduces the brush data as needed and converts the inputted ROP code to a ROP code indicating a ROP process (logic operation) that uses the source bitmap and that is equivalent to the ROP process corresponding to the original ROP code. The ROP process controller 55 then sets the source bitmap to the enlarged or reduced brush data and directs the ROP processor 51 to execute the process corresponding to the converted ROP code, thereby subjecting the destination bitmap to an image process equivalent to the inputted ROP code.

In order to convert a ROP code associated with an operational expression that uses brush data to a combination of ROP codes associated with operational expressions that use the source bitmap and not brush data, the ROP process controller 55 includes a conversion table 55a for storing associations between ROP codes associated with operational expressions using brush data and combinations of ROP codes capable of achieving an image process equivalent to the image process implemented by the original ROP code (ROP codes associated with operational expressions that use the source bitmap, but do not use the brush data).

ROP codes are expressed with two digits in hexadecimal. In ROP processes corresponding to ROP codes with identical first and second digits, the logic operation performed uses only the source bitmap and the destination bitmap. For ROP processes corresponding to ROP codes configured of the numbers "0", "5", "a", and "f" (such as 50, af, and 5a), the logic operations performed use only the brush data and the destination bitmap.

Hence, even when ROP codes indicate logic operations using all of brush data, the source bitmap, and the destination bitmap, the ROP processes corresponding to these numbers can be divided into logic operations using only the source bitmap and the destination bitmap, and logic operations using only the brush data and destination bitmap, which operations can be executed separately.

Specifically, when executing a ROP process after enlarging or reducing the brush data and setting the resultant data as the source bitmap to this data, the logic operation using the brush data, source bitmap, and destination bitmap may be divided into a logic operation using only the source bitmap and the destination bitmap, and a logic operation using only the brush data and the destination bitmap. At the same time, the logic operations using only the brush data and the destination bitmap can be converted to equivalent logic operations using only the source bitmap and the destination bitmap. The conversion table 55a is created according to this method and stored in the device.

Referring to FIG. 4, the conversion table 55a includes conversion source code data indicating the ROP code targeted for conversion and conversion procedure data indicating the procedure for converting the ROP code, for each of the ROP codes that are targeted for conversion. In the preferred embodiment, ROP codes targeted for conversion are those associated with operational expressions that use brush data.

The conversion procedure data primarily includes a combination of ROP codes associated with operational expressions that do not use brush data and that can implement a ROP process equivalent to the ROP process indicated by the ROP code targeted for conversion. The conversion procedure data further includes the source data indicating the type of raster image data to be set as the source bitmap during the ROP process indicated by each ROP code constituting the combination of ROP codes.

A ROP process equivalent to the ROP process indicated by the ROP code targeted for conversion can be implemented by setting the raster image data in the center column of the table under source data as the source bitmap based on the order of process sequence code NM that are included in the left column of the conversion procedure data, and directing the ROP processor 51 to execute the ROP process indicated by the ROP code listed in the right column under conversion destination code data.

In the ROP process indicated by ROP code "e9", the ROP processor 51 performs a logic operation according to the operational expression "not (D xor (S xor (P and (not (D and S))))))", where P is the operand for brush data, S the operand for the source bitmap, and D the operand for the destination bitmap.

In the equivalent ROP process, the ROP processor 51 performs a logic operation according to the operational expression "not (D and S)" in the ROP process indicated by ROP code "77"; the logic operation according to operational expression "S and D" in the ROP process indicated by ROP code "88"; the logic operation according to operational expression "S xor D" in the ROP process indicated by ROP code "66"; and the logic operation according to operational expression "not (S xor D)" in the ROP process indicated by ROP code "99".

Specifically, as shown in FIG. 4, when performing the ROP process indicated by ROP code "e9" using ROP codes associated with operational expressions that do not use brush data (operational expressions not including the operand P), first the source bitmap specified together with the inputted ROP code "e9" (hereinafter referred to as the "original source bitmap") is set as the source bitmap and the ROP process corresponding to ROP code "77" of NM=1 is executed. Next, the brush data resulting from a process for enlarging or reducing the brush data specified together with the inputted ROP code "e9" (converted brush data) is set as the source bitmap and the ROP process indicated by ROP code "88" of NM=2 is executed.

Next, the original source bitmap is set as the source bitmap and the ROP process corresponding to ROP code "66" of NM=3 is executed. Subsequently, the destination bitmap specified together with the inputted ROP code "e9" (hereinafter referred to as the "original destination bitmap") is set as the source bitmap and the ROP process corresponding to ROP code "99" of NM=4 is executed.

Here, a special process must be executed in order to achieve the same effects with the brush data set as the source bitmap as the effects achieved in the ROP process using brush data (in other words, in order to form a pattern). This special process will be described later.

In this way, the ROP process controller 55 of the preferred embodiment converts the ROP code associated with the operational expression using brush data (the operational expression that includes the operand P) to a combination of ROP codes associated with operational expressions that do not use brush data but use the source bitmap (operational expressions that do not include the operand P but include the operand S). Subsequently, the ROP process controller 55 executes the ROP process (logic operation) equivalent to the ROP process using brush data.

Figure 5:
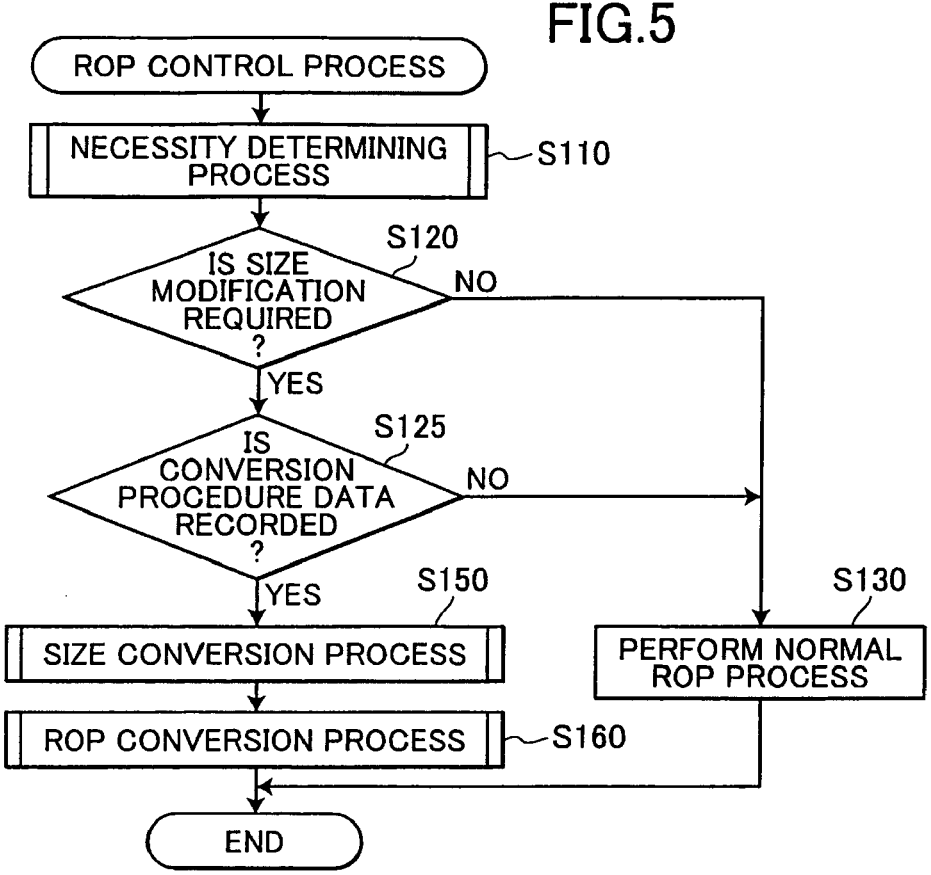
FIG. 5 is a flowchart showing steps in a ROP control process that the ROP process controller executes when a ROP command is entered along with a ROP code.

Referring to FIG. 5, at the beginning of the ROP control process in S110 the ROP process controller 55 performs a necessity determining process to determine whether a process is required to modify the size of the brush data. In S120 the ROP process controller 55 determines whether size modification is necessary based on the results from the necessity determining process. If the ROP process controller 55 determines that size modification is not necessary (S120: NO), then in S130 the ROP process controller 55 enters the ROP code received together with the ROP command into the ROP processor 51 together with the brush data, source bitmap, and destination bitmap specified by the ROP command, and instructs the ROP processor 51 to execute a ROP process indicated by this ROP code.

However, if the ROP process controller 55 determines in S120 that the size of the brush data is required to be modified (S120: YES), then in S125 the ROP process controller 55 determines whether conversion procedure data for the received ROP code is recorded in the conversion table 55a. If this conversion procedure data has not been recorded (S125: NO), then the ROP process controller 55 implements the process in S130 described above, and the ROP control process ends.

However, if the ROP process controller 55 determines in S125 that the conversion procedure data for the ROP code is recorded in the conversion table 55a (S125: YES), then in S150 the ROP process controller 55 subjects the brush data to the size modifying operation. Subsequently, in S160 the ROP process controller 55 executes the ROP conversion process. The ROP process controller 55 executes the process described above each time a ROP code is entered together with a ROP command.

Figure 6:
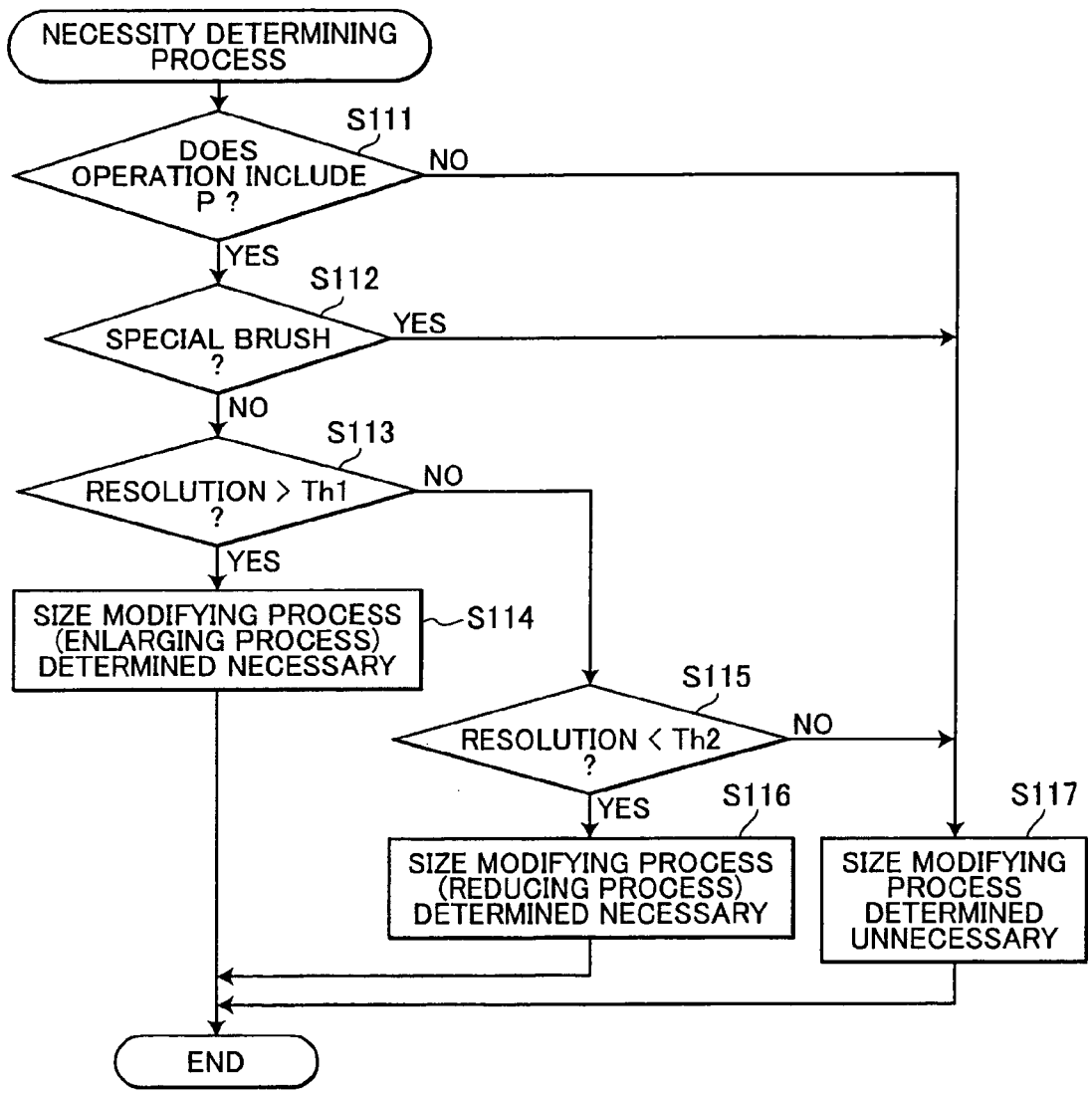
FIG. 6 is a flowchart showing steps in the necessity determining process that the ROP process controller executes in S110 of the ROP control process.

Referring to FIG. 6, at the beginning of the necessity determining process in S111, the ROP process controller 55 determines whether the ROP code received with the ROP command is associated with an operational expression using brush data (an operational expression including the operand P). If the ROP process controller 55 determines that the ROP code is not associated with an operational expression using brush data (S111: NO), then in S117 the ROP process controller 55 determines that the size modifying process is unnecessary, and the necessity determining process ends.

However, if the ROP process controller 55 determines in S111 that the ROP code is associated with an operational expression using brush data (S111: YES), then in S112 the ROP process controller 55 determines whether the brush data specified in the ROP command with the ROP code is special brush data. In the present invention, special brush data means brush data indicating a solid image of a single color. If the ROP process controller 55 determines in S112 that the brush data indicated with the ROP command is special brush data (S112: YES), then in S117 the ROP process controller 55 determines that the size modifying process is unnecessary, and the necessity determining process ends.

However, if the ROP process controller 55 determines in S112 that the brush data specified with the ROP command is not special brush data (S112: NO), then in S113 the ROP process controller 55 determines whether the printing resolution of the printer 10 is greater than a first threshold Th1 based on data for the printing resolution of the printer 10 stored in the hard disk drive 37. In the present invention, the printing resolution means the resolution of a raster image that the image-forming unit 17 in the image-forming system 1 forms on paper.

If the ROP process controller 55 determines in S113 that the printing resolution of the printer 10 is greater than the first threshold Th1 (S113: YES), then in S114 the ROP process controller 55 determines that the size modifying process is necessary. In this case, the ROP process controller 55 determines in S114 that a brush enlarging process is required as the size modifying process. Subsequently, the ROP process controller 55 ends the necessity determining process.

However, if the ROP process controller 55 determines that the printing resolution is less than or equal to the first threshold Th1 (S113: NO), then in S115 the ROP process controller 55 determines whether the printing resolution of the printer 10 is less than a second threshold Th2, where Th1≧Th2.

If the ROP process controller 55 determines that the printing resolution of the printer 10 is smaller than the second threshold Th2 (S115: YES), then in S116 the ROP process controller 55 determines that a size modifying process is necessary. In this case, the ROP process controller 55 determines in S116 that a brush reducing process is required as the size modifying process. However, if the ROP process controller 55 determines in S115 that the printing resolution of the printer 10 is greater than or equal to the second threshold Th2 (S115: NO), then in S117 the ROP process controller 55 determines that the size modifying process is unnecessary and ends the necessity determining process.

Figure 7:
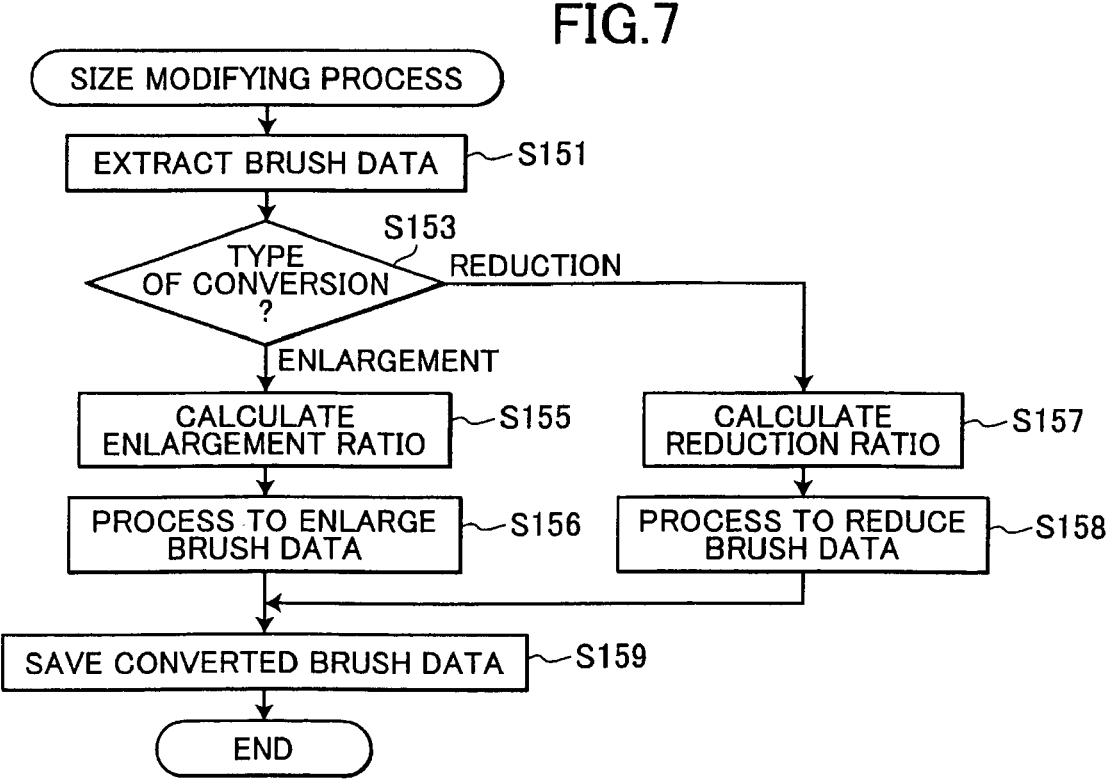
FIG. 7 is a flowchart illustrating steps in the size modifying process that the ROP process controller executes in S150 of the ROP control process.

Next, the size modifying process will be described with reference to FIG. 7. At the beginning of the size modifying process in S151, the ROP process controller 55 extracts the brush data specified with the ROP command (raster image data of a standard size). In S153 the ROP process controller 55 determines the type of conversion being performed. Specifically, the ROP process controller 55 whether the brush enlarging process or the brush reducing process was determined necessary in the necessity determining process.

If the ROP process controller 55 determines that the brush enlarging process is required, then in S155 the ROP process controller 55 finds the expansion ratio for the brush data. The expansion ratio is found using the following equation (expansion ratio)=(printing resolution)/Th1 wherein Th1 is a threshold.

After completing the calculation in S155, in S156 the ROP process controller 55 performs a process to enlarge the brush data using the expansion ratio found in S155. Specifically, the ROP process controller 55 executes a process for extending the brush from its original size to a size corresponding to the expansion ratio, where size is the number of dots. After completing the expansion process, in S159 the ROP process controller 55 saves the enlarged brush data in the RAM 35 as the converted brush data, and ends the size modifying process.

However, if the ROP process controller 55 determines in S153 that the brush reducing process is required, then in S157 the ROP process controller 55 finds the reduction ratio for the brush data. The reduction ratio is found according to the following equation.

(reduction ratio)=(printing resolution)/Th2 wherein Th2 is threshold (Th1≧Th2)

After completing the calculation in S157, in S158 the ROP process controller 55 performs a process to reduce the brush data according to the reduction ratio found in S157. Specifically, the ROP process controller 55 executes a process to reduce the brush from its original size to a size corresponding to the reduction ratio. After completing the reduction process, in S159 the ROP process controller 55 saves the reduced brush data in the RAM 35 as the converted brush data and ends the size modifying process.

Next, the ROP conversion process will be described with reference to FIG. 8. At the beginning of the process in S161, the ROP process controller 55 executes an initialization process to set a variable CN to 1. In S162 the ROP process controller 55 inputs the variable CN into the ROP processor 51 together with the destination bitmap specified with the ROP command.

In S163 the ROP process controller 55 determines whether it is necessary to back up the destination bitmap inputted in S162. If the ROP process controller 55 determines that a backup is required (S163: YES), then in S165 the inputted destination bitmap is saved in the RAM 35 as the original destination bitmap, and the ROP process controller 55 advances to S167. However, if the ROP process controller 55 determines that a backup is not required (S163: NO), then the ROP process controller 55 skips to S167 without executing the process in S165.

In the preferred embodiment, the ROP process controller 55 determines whether a backup is necessary in S163 based on whether the original destination bitmap is recorded as source data in the conversion procedure data corresponding to the ROP code targeted for conversion. More specifically, the ROP process controller 55 determines that a backup is required if the original destination bitmap has been recorded as source data, but that a backup is not required if the original destination bitmap has not been recorded as source data.

In S167 the ROP process controller 55 extracts the source data and conversion destination code data from the conversion table 55a for the process sequence code NM equivalent to the value of the variable CN included in the conversion procedure data corresponding to the ROP code targeted for conversion. From this data, the ROP process controller 55 can derive ROP codes for implementing ROP processes equivalent to the ROP code inputted into the ROP process controller 55 with the ROP command, and the raster image data to be used as the source bitmap for the ROP processes corresponding to these ROP codes. In S170 the ROP process controller 55 executes a ROP conversion control process.

Figure 9:
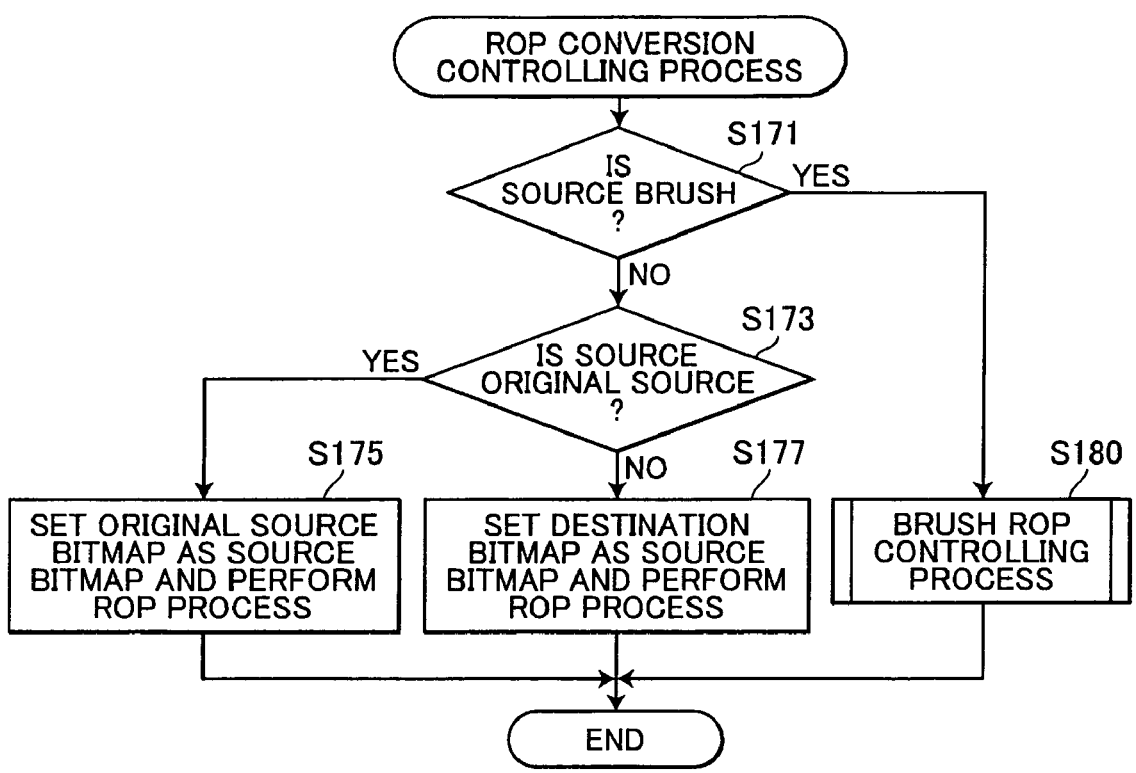
FIG. 9 is a flowchart illustrating the steps in the ROP conversion control process executed in S170 of the ROP conversion process.

Referring to FIG. 9, at the beginning of the ROP conversion control process in S171, the ROP process controller 55 determines whether the source data extracted in S167 specifies brush data. If the ROP process controller 55 determines that this source data does not specify brush data (S171: NO), then in S173 the ROP process controller 55 determines whether the source data specifies the original source bitmap.

If the ROP process controller 55 determines in S173 that the source data specifies the original source bitmap (S173: YES), then in S175 the ROP process controller 55 inputs the original source bitmap as the source bitmap and the ROP codes indicated by the conversion destination code data extracted in S167 into the ROP processor 51, and instructs the ROP processor 51 to execute logic operations based on the operational expressions associated with these ROP codes using the original source bitmap as the source bitmap. Subsequently, the ROP conversion control process ends.

However, if the ROP process controller 55 determines in S173 that the source data does not indicate the original source bitmap (S173: NO), then in S177 the ROP process controller 55 inputs the original destination bitmap as the source bitmap and the ROP codes indicated by the conversion destination code data into the ROP processor 51 and instructs the ROP processor 51 to execute logic operations according to the operational expressions associated with these ROP codes using the original destination bitmap as the source bitmap. Subsequently, the ROP conversion control process ends.

However, if the ROP process controller 55 determines in S171 that the source data extracted in S167 indicates brush data (S171: YES), then in S180 the ROP process controller 55 executes a brush ROP control process shown in FIG. 10. After completing the brush ROP control process, the ROP process controller 55 ends the ROP conversion control process.

Figure 10:
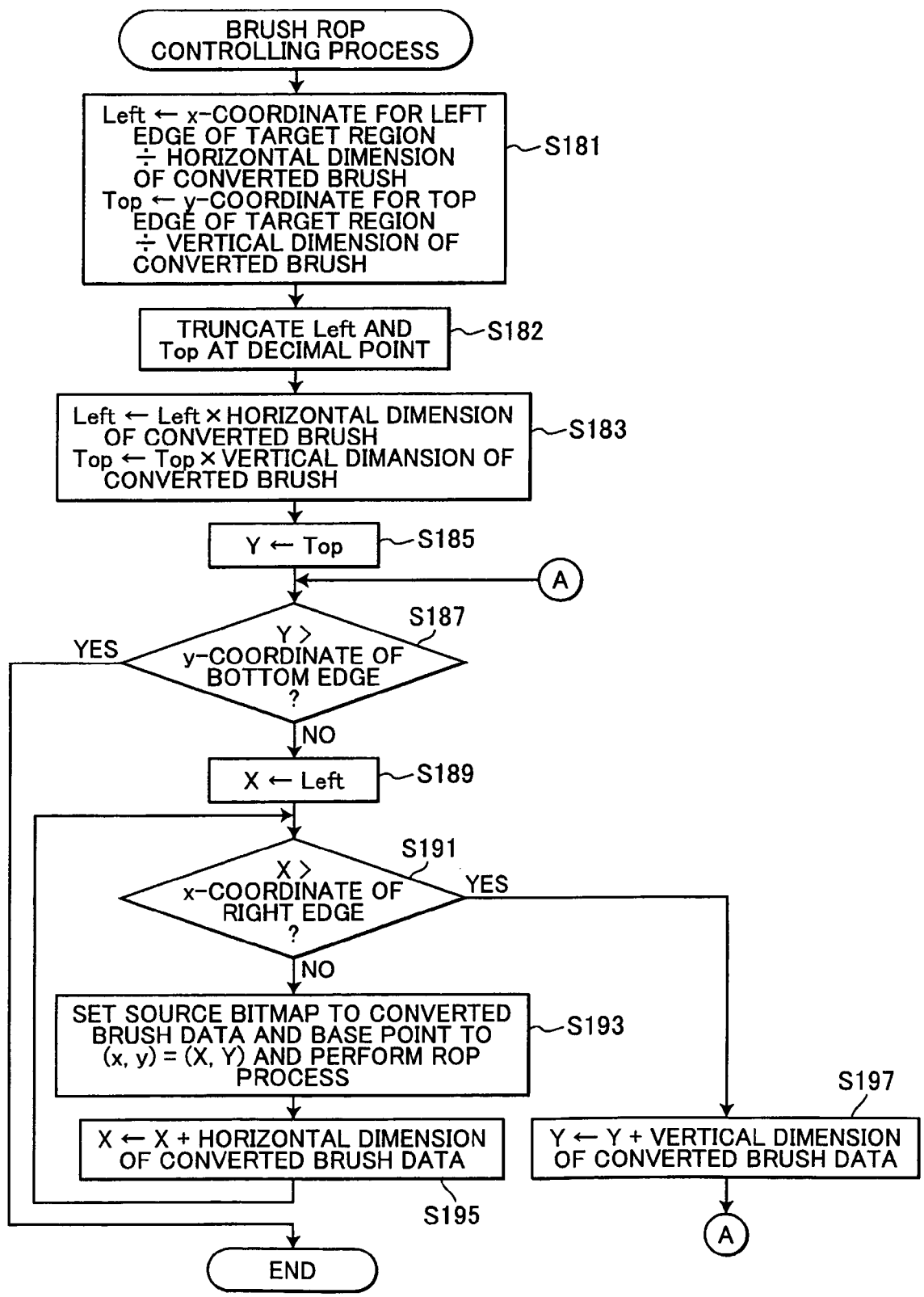
FIG. 10 is a flowchart showing steps in a brush ROP control process executed in S180.

Referring to FIG. 10, in the brush ROP control process, the ROP process controller 55 divides the target region for image processing in the destination bitmap specified together with the inputted ROP code into sections corresponding to the size of the converted brush data, that is, corresponding to the vertical dimension of the converted brush data (the number of dots in the vertical (y) direction) and the horizontal dimension (dot number in the left-to-right (x) direction). The ROP process controller 55 directs the ROP processor 51 to perform logic operations on each section in the destination bitmap using the converted brush data as the source bitmap.

Figure 11:
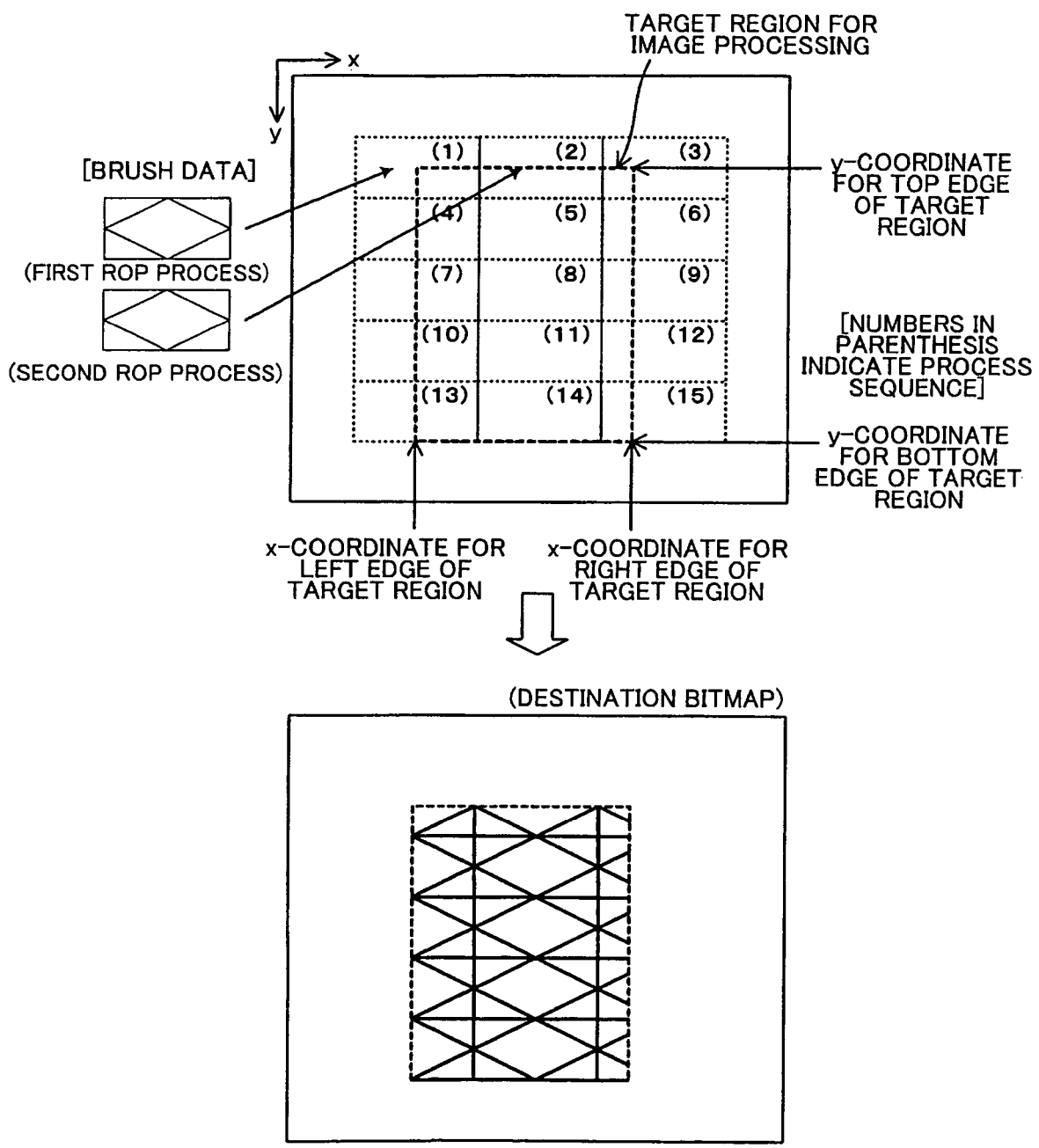
FIG. 11 is an explanatory diagram illustrating the logic operations performed on each section.

First, in S181 of the brush ROP control process, the ROP process controller 55 finds the values of variables Left and Top according to the following equations in order to divide the target region for image processing as shown in FIG. 11.

(Left)=($x$ coordinate for left edge of target region)/
(horizontal dimension of converted brush data)

(Top)=($y$ coordinate for top edge of target region)/
(vertical dimension of converted brush data)

The x-y coordinate system used in this embodiment has a point of origin set to the upper left corner of the raster image data, with the x-axis extending to the right from this point of origin and the y-axis extending downward.

After completing the process in S181, the ROP process controller 55 truncates the values of the variables Left and Top to the decimal point in S182 and advances to S183, In S183 the ROP process controller 55 updates the variable Left to the value obtained by multiplying the horizontal dimension of the converted brush data by the variable Left found in S182, and updates the variable Top to a value obtained by multiplying the vertical dimension of the converted brush data by the variable Top found in S182.

Left←Left x horizontal dimension of converted brush data

Top←Top x vertical dimension of converted brush data

In S185 the ROP process controller 55 sets a variable Y to the value of the variable Top. In S187 the ROP process controller 55 determines whether the value of the variable Y exceeds the value of the y coordinate for the bottom edge of the target region. If the ROP process controller 55 determines that the variable Y has not exceeded the y coordinate for the bottom edge (S187: NO), then in S189 the ROP process controller 55 sets a variable X to the value of the variable Left. In S191 the ROP process controller 55 determines whether the variable X has exceeded the x coordinate for the right edge of the target region.

If the variable X has not exceeded the value of the x coordinate for the right edge (S191: NO), then in S193 the ROP process controller 55 inputs the converted brush data into the ROP processor 51 as the source bitmap and sets a base point for the logic operations to the coordinate (x,y) of the destination bitmap (X,Y). Also in S193 the ROP process controller 55 inputs the ROP code indicated by the conversion destination code data into the ROP processor 51 and directs the ROP processor 51 to perform the logic operations according to the operational equations associated with this ROP code, using the converted brush data as the source bitmap.

Here, the ROP processor 51 overlaps the coordinate (x,y)=(X,Y) of the destination bitmap with the upper left corner (x,y)=(0,0) of the converted brush data, and performs logic operations with the bits for each coordinate of the converted brush data (x,y)=(n,m) and bits for each coordinate belonging to the target region for image formation in the destination bitmap (x,y)=(X+n,Y+m), where n and m are variables. The logic operations are not performed for areas of the destination bitmap outside the target region.

After completing the process in S193, in S195 the ROP process controller 55 updates the variable X to the sum of the variable X used in S193 and the value of the horizontal dimension of the converted brush data.

X←X+horizontal dimension of the converted brush data

After completing the process in S195, the ROP process controller 55 returns to S191 and again determines whether the value of the updated variable X exceeds the value of the x coordinate for the right edge of the target region.

If the ROP process controller 55 determines that the variable X does not exceed the value of the x coordinate for the right edge (S191: NO), then in S193 the ROP process controller 55 inputs the converted brush data into the ROP processor 51 as the source bitmap and sets the base point for the logic operations to the coordinates (x,y)=(X,Y) of the destination bitmap. Also in S193 the ROP process controller 55 inputs the ROP code indicated in the conversion destination code data into the ROP processor 51 and directs the ROP processor 51 to perform logic calculations corresponding to operational expressions associated with this ROP code using the converted brush data as the source bitmap.

By repeating this operation, the ROP process controller 55 executes the logic operations using the converted brush data on successive sections of the destination bitmap in the x direction, where the sections correspond to the size of the brush data. As a result, the ROP process controller 55 forms patterns in the destination bitmap sequentially in the x-direction based on the converted brush data, as shown in FIG. 11.

Further, if the ROP process controller 55 determines in S191 that the variable X has exceeded the value of the x coordinate for the right edge of the target region (S191: YES), then in S197 the ROP process controller 55 sets the variable Y to the sum of the value of the variable Y used in S193 and the value of the vertical dimension for the converted brush data.

Y←Y+vertical dimension of converted brush data

After completing the process in S197, the ROP process controller 55 returns to S187 and again determines whether the value of the variable Y has exceeded the y coordinate for the bottom edge of the target region. If the ROP process controller 55 determines that the variable Y has not exceeded this y coordinate (S187: NO), then the ROP process controller 55 repeats the process of S189-S195 using this value for the variable Y, thereby shifting the targeted section in the y-direction by the vertical dimension of the brush data and executing the logic calculations using the converted brush data on each section in the x direction corresponding to the size of the brush data. However, if the ROP process controller 55 determines that the value of the variable Y has exceeded the y coordinate for the lower edge of the target region (S187: YES), then the ROP process controller 55 ends the brush ROP control process and subsequently ends the ROP conversion control process. Through these processes, a pattern based on the converted brush data is formed in each section corresponding to the size of the converted brush data over the entire target region for image processing.

Figure 8:
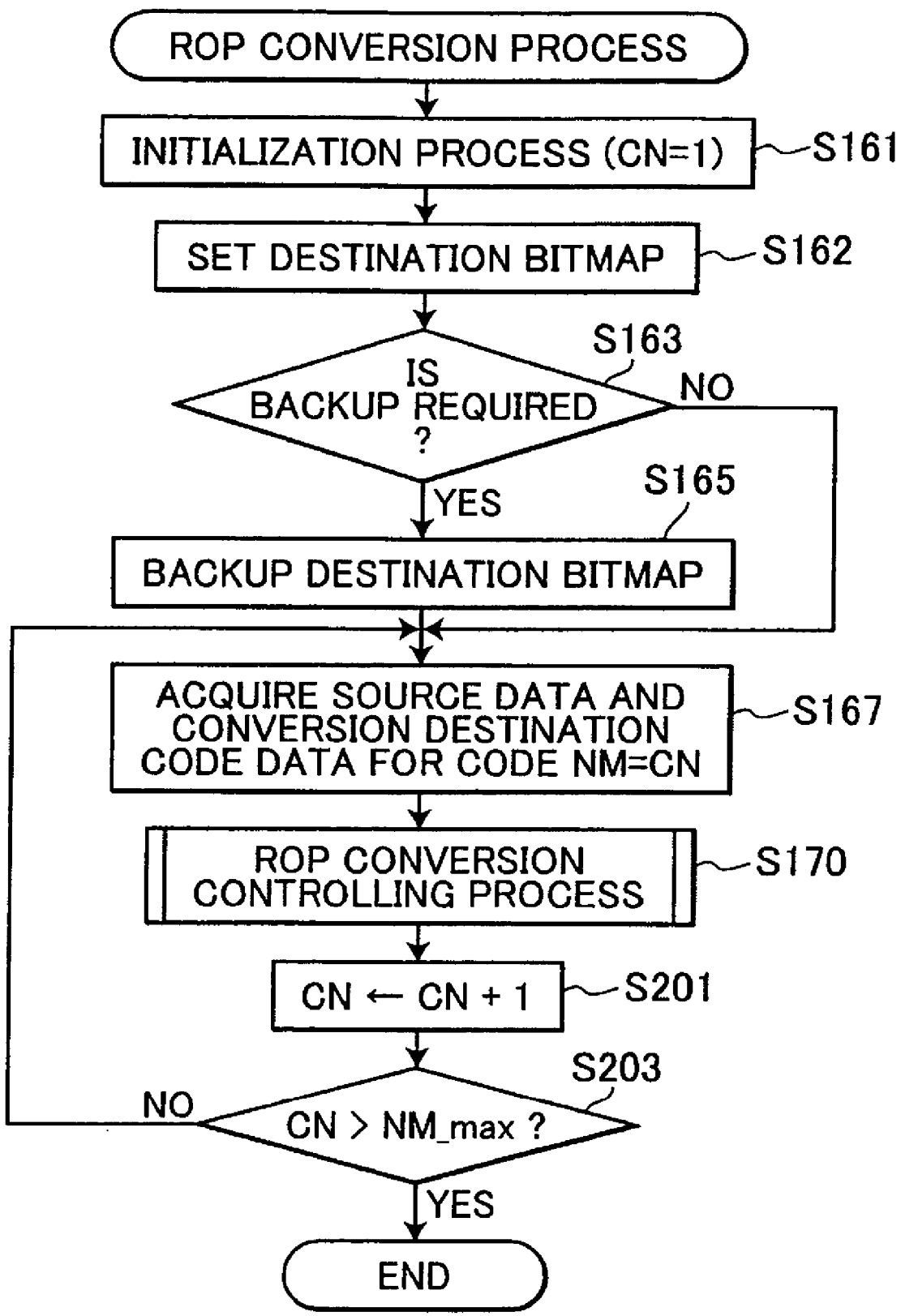
FIG. 8 is a flowchart showing steps in the ROP conversion process that the ROP process controller executes in S160 of the ROP control process.

After completing the ROP conversion control process in S170 of FIG. 8, in S201 the ROP process controller 55 increments the variable CN by one. In S203 the ROP process controller 55 determines whether the value of the incremented variable CN exceeds a maximum value NM_max of the process sequence code in the conversion procedure data corresponding to the ROP code targeted for conversion.

If the ROP process controller 55 determines that the variable CN has not exceeded the maximum value NM_max (S203: NO), then the ROP process controller 55 returns to S167 to acquire the source data and conversion destination code data for the process sequence code NM=CN equivalent to the value of the variable CN in the conversion procedure data corresponding to the ROP code targeted for conversion. In S170 the ROP process controller 55 executes the ROP conversion control process based on this data.

However, if the ROP process controller 55 determines that the variable CN has exceeded the maximum value NM_max (S203: YES), then the ROP process controller 55 ends the ROP conversion process.

Through the steps of the ROP conversion process described above, a ROP process equivalent to the ROP process indicated by the ROP code, which was inputted into the ROP process controller 55 with the ROP command, is implemented by combining ROP codes associated with operational expressions using the source bitmap, rather than brush data. Accordingly, an image process equivalent to the image process for the ROP code inputted into the ROP process controller 55 is executed on the destination bitmap.

Figure 12:
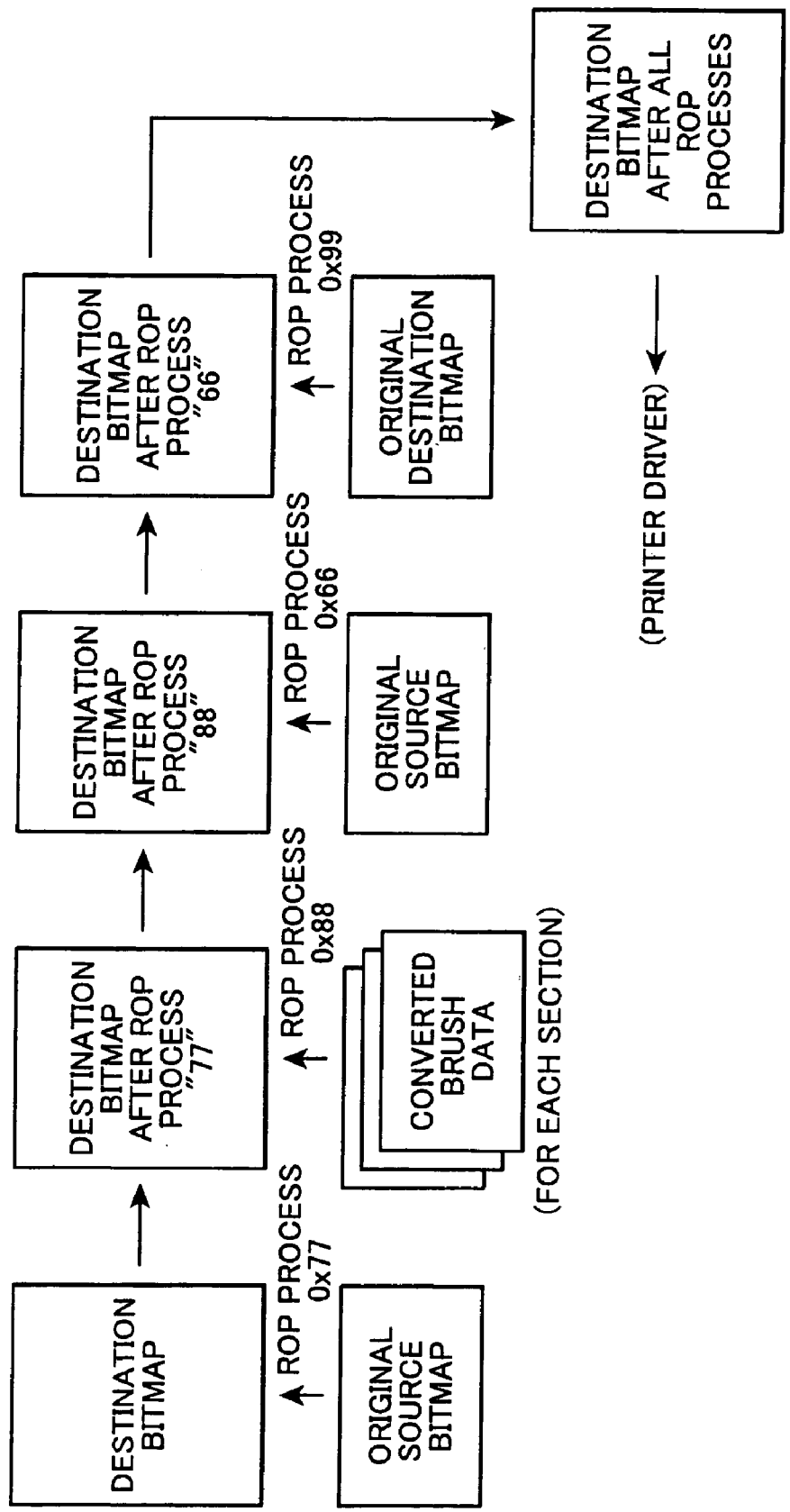
FIG. 12 is an explanatory diagram illustrating steps in the ROP conversion process when the ROP code to be converted is "e9"

As shown in FIG. 12, when executing the ROP conversion process for ROP code "e9", the ROP processor 51 is controlled to execute the ROP process corresponding to ROP code "77" at NM=1 when CN=1 (S175 of FIG. 9). When CN=2, the ROP processor 51 is controlled to execute the ROP process corresponding to ROP code "88" at NM=2 using the destination bitmap that was processed at NM=1 and the converted brush data for each section corresponding to the size of the converted brush data during the brush ROP control process (S180 of FIG. 9).

When CN=3, the ROP processor 51 is controlled to execute the ROP process corresponding to ROP code "66" at NM=3 (S175 of FIG. 9) using the destination bitmap processed at NM=2 and the original source bitmap. When CN=4, the ROP processor 51 is controlled to execute the ROP process corresponding to ROP code "99" at NM=4 (S177 of FIG. 9) using the destination bitmap processed at NM=3 and the original destination bitmap.

Subsequently, the ROP process controller 55 sets CN=5 (S201 of FIG. 8) and determines in S203 that the value of the variable CN exceeds the maximum number NM_max=4 of the process sequence code (S203: YES), and the ROP conversion process ends. After ending the ROP conversion process, the ROP process controller 55 similarly ends the ROP control process. When the ROP control process ends, the printer driver 53 converts the destination bitmap that has undergone the ROP process described above into input image data and inputs this image data into the printer 10.

In the image-forming system 1 of the first embodiment described above, the data processing device 30 determines based on the printing resolution of the printer 10 whether an operation is needed to modify the size of the brush data. When size modification is required, the data processing device 30 performs a process to either enlarge or reduce the brush data based on the printing resolution, where the brush data is raster image data of a standard size. In addition, the data processing device 30 converts ROP codes associated with operational expressions using brush data (operational expressions having the operand P) into combinations of ROP codes associated with operational expressions using the source bitmap instead of brush data (operational expressions using the operand S and not the operand P). With this combination of ROP codes, the data processing device 30 controls the ROP processor 51 to execute the ROP processes using the enlarged or reduced brush data (converted brush data) as the source bitmap.

Hence, the data processing device 30 of the preferred embodiment can form a pattern (brush) of a size suitable for the printing resolution of the printer 10 in the destination bitmap. Accordingly, the data processing device 30 can prevent a pattern (brush) that is too small from being rendered on the paper during image formation (printing) based on the destination bitmap, which can occur when the printing resolution of the printer 10 is too high.

Further, since the brush data is subjected to the reduction process in the preferred embodiment when the printing resolution of the printer 10 is a low resolution, the data processing device 30 can avoid rendering a pattern (brush) that is too large on paper due to the low printing resolution.

When the size conversion operation is unnecessary, the data processing device 30 can input the ROP code unchanged into the ROP processor 51 as normal and control the ROP processor 51 to execute the corresponding ROP process. In this way, the data processing device 30 can avoid a drop in processing speed for the image process (ROP process).

Further, the data processing device 30 derives a combination of ROP codes associated with operational expressions that includes the operand S but not the operand P based on the contents of the conversion table 55a. Hence, the data processing device 30 can analyze the operational expressions associated with the ROP code to be converted and can quickly convert the ROP code, without deriving the conversion procedure.

In the preferred embodiment described above, ROP codes together with data related to the source bitmap used when executing ROP processes corresponding to these ROP codes are recorded in the conversion table 55a as the conversion procedure data. Therefore, when a ROP command is issued for a ROP code associated with a complex operational expression configured of operands P, S, and D, the data processing device 30 can perform a process to reduce or enlarge the brush data and can implement the ROP process corresponding to an operational expression having operands P, S, and D with a ROP process corresponding to an operational expression using operands S and D, while treating the processed brush data as the source bitmap.

The ROP process controller 55 of the preferred embodiment described above implements a ROP process equivalent to the ROP process corresponding to the operational expression using the operand P by executing the ROP process for each section of the target region corresponding to the size of the converted brush data. However, the brush ROP control process may be configured to generate compound brush data combining a plurality of converted brush data and to execute ROP processes equivalent to the ROP process corresponding to operational expressions using the operand P while using this compound brush data as the source bitmap (as described below in a second embodiment of the present invention).

Figure 13:
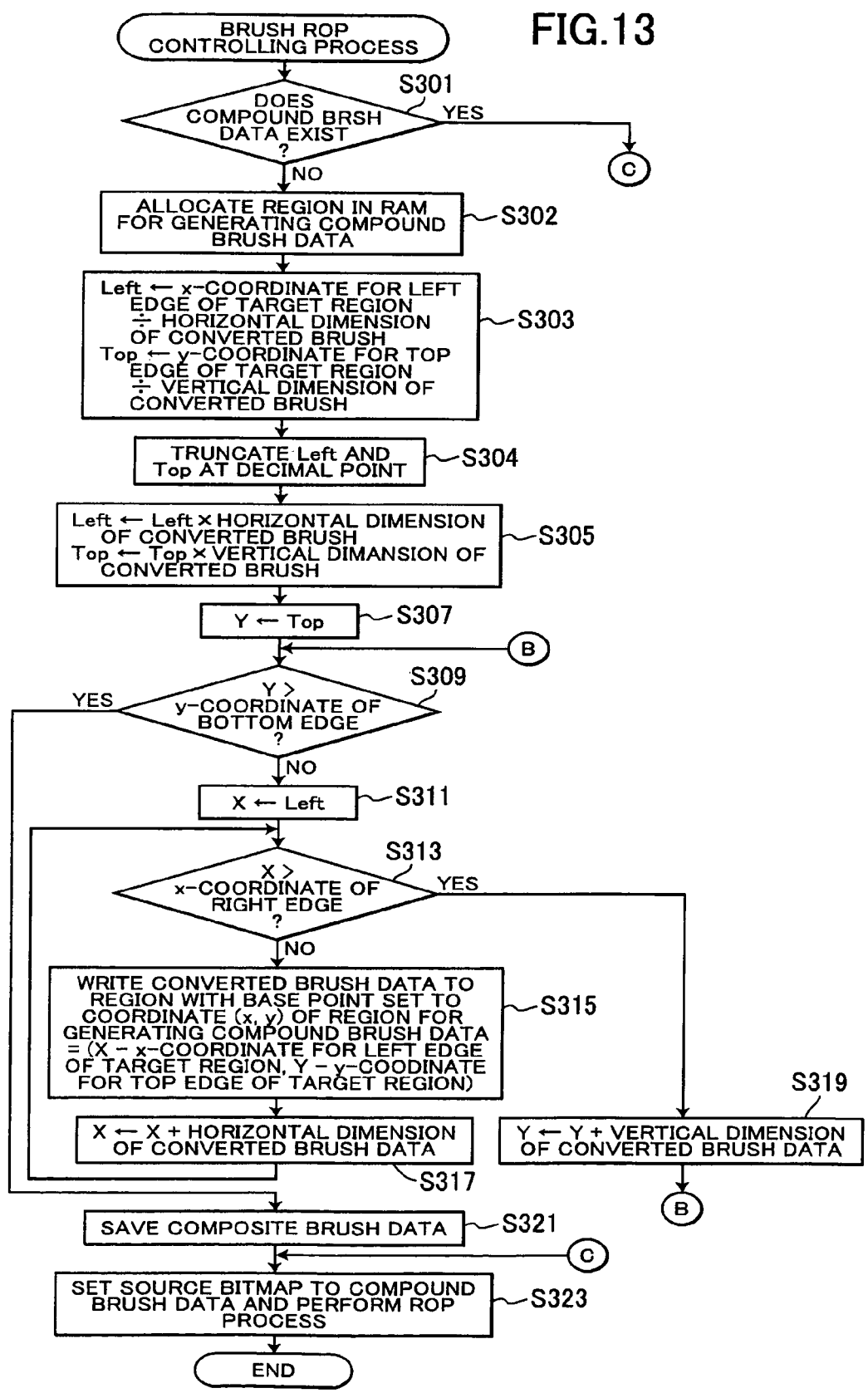
FIG. 13 is a flowchart showing steps in a brush ROP control process that the ROP process controller executes in S180 of FIG. 9 according to a second embodiment of the present invention.

The next description will be made for explaining the second embodiment of the present invention. Referring to FIG. 13, in the brush ROP control process according to the second embodiment, a plurality of converted brush data is combined in a series. The ROP process controller 55 generates combined brush data of a size corresponding to the target region in the destination bitmap specified with the ROP command and controls the ROP processor 51 to execute corresponding ROP processes (logic operations) using this combination brush data as the source bitmap.

In S301 of the brush ROP control process, the ROP process controller 55 determines whether compound brush data has already been generated and saved in the RAM 35. If the ROP process controller 55 determines that no compound brush data has been saved (S301: NO), then in S302 the ROP process controller 55 allocates an area in the RAM 35 for generating compound brush data of the same size as the target region for image processing. In S303 the ROP process controller 55 finds values for variables Left and Top according to the same process described in S181 of FIG. 10.

After completing the process in S303, in S304 the ROP process controller 55 truncates the values for variables Left and Top at the decimal point. In S305 the ROP process controller 55 updates the variable Left to the value obtained by multiplying the value of the variable Left found in S304 by the horizontal dimension of the converted brush data, and updates the variable Top to a value obtained by multiplying the value of the variable Top found in S304 by the vertical dimension of the converted brush data.

In S307 the ROP process controller 55 sets the variable Y to the value of the variable Top. In S309 the ROP process controller 55 determines whether the value of the variable Y has exceeded the value of the y coordinate for the bottom edge of the target region. If the ROP process controller 55 determines that the variable Y has not exceeded the y coordinate for the bottom edge (S309: NO), then in S311 the ROP process controller 55 sets the variable X to the value of the variable Left. In S313 the ROP process controller 55 determines whether the value of the variable X has exceeded the x coordinate for the right edge of the target region.

If the ROP process controller 55 determines that the variable X has not exceeded the value of the x coordinate for the right edge (S313: NO), then in S315 the ROP process controller 55 aligns the coordinates (x,y)=(X−x coordinate for the left edge of the target region, Y−y coordinate for the top edge of the target region) of the region allocated in S302 for generating compound brush data and the upper left corner of the converted brush data, and copies (writes) the converted brush data to the region for generating compound brush data.

After completing the process in S315, in S317 the ROP process controller 55 updates the variable X to the sum of the variable X used in S315 and the horizontal dimension of the converted brush data.

After completing the process in S317, the ROP process controller 55 returns to S313 and determines again whether the value of the updated variable X exceeds the value of the x coordinate for the right edge of the target region. If the ROP process controller 55 determines that the variable X does not exceed the value of the x coordinate (S313: NO), then in S315 the ROP process controller 55 copies the converted brush data to the area for generating compound brush data according to the technique described above.

However, if the ROP process controller 55 determines that the value of the variable X exceeds the value of the x coordinate for the right edge of the target region (S313: YES), then in S319 the ROP process controller 55 updates the variable Y to the sum of the variable Y used in S315 and the vertical dimension of the converted brush data.

Figure 14:
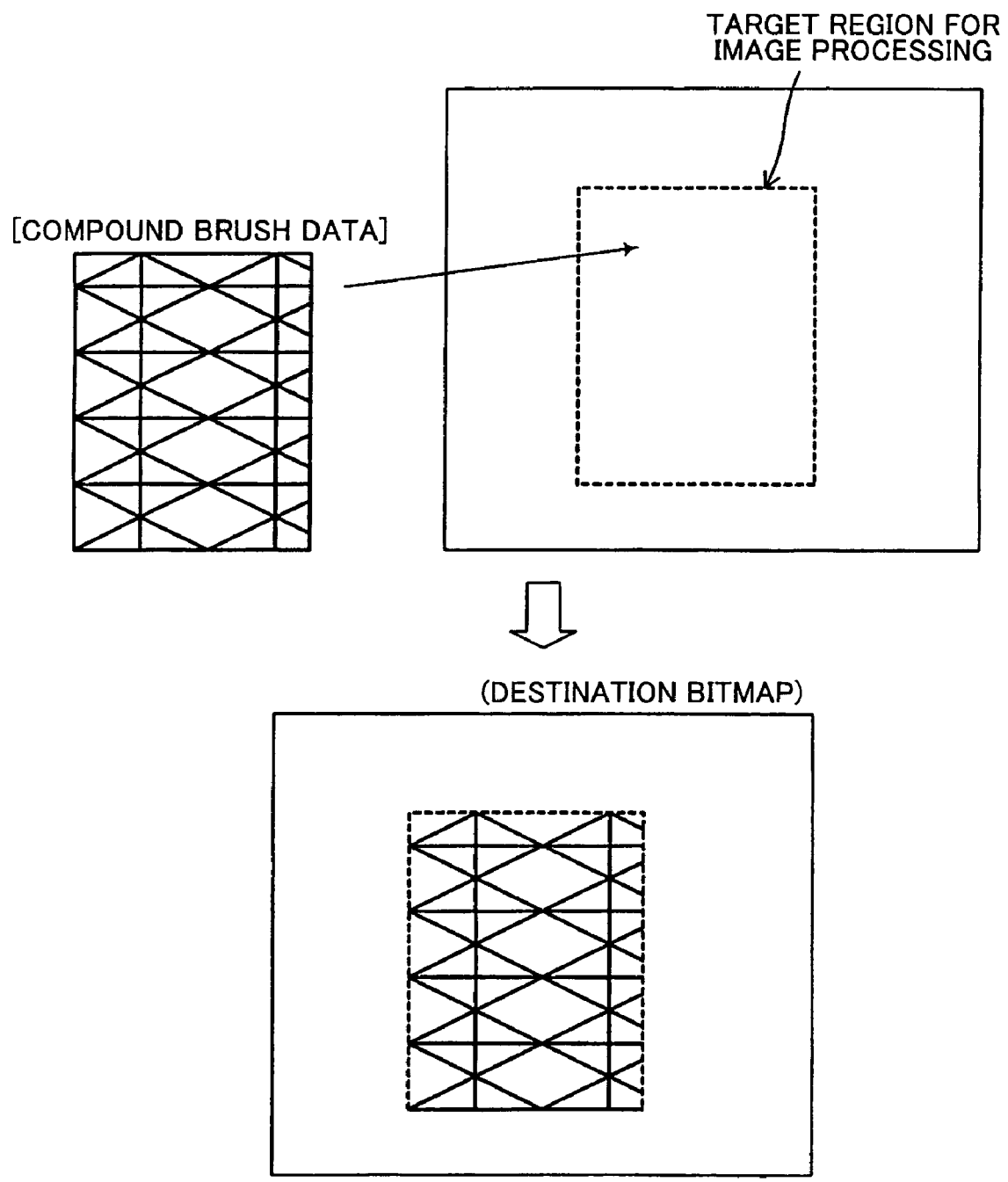
FIG. 14 is an explanatory diagram illustrating the technique of the ROP process (logic operation) using compound brush data.

After completing the process in S319, the ROP process controller 55 returns to S309 and again determines whether the value of the variable Y exceeds the y coordinate for the lower edge of the target region. If the variable Y does not exceed this y coordinate (S309: NO), then the ROP process controller 55 repeats the process in S311-S317 using the new value of the variable Y. However, if the ROP process controller 55 determines that the variable Y exceeds the y coordinate (S309: YES), then in S321 the ROP process controller 55 saves the data copied to the region for generating compound brush data of a size corresponding to the target region for image processing, to the RAM 35 as compound brush data (see FIG. 14).

After completing the process in S321, in S323 the ROP process controller 55 inputs the compound brush data saved in the RAM 35 into the ROP processor 51 as the source bitmap, inputs the ROP code indicated in the conversion destination code data acquired in S167 into the ROP processor 51, and controls the ROP processor 51 to execute logic calculations corresponding to operational expressions associated with the ROP code using the compound brush data as the source bitmap.

Further, if the ROP process controller 55 determines in S301 that compound brush data has been saved in the RAM 35 (S301: YES), then the ROP process controller 55 advances to S323 and controls the ROP processor 51 to execute the corresponding logic operations using the compound brush data as the source bitmap, as described above. After completing the process in S323, the ROP process controller 55 ends the brush ROP control process of the second embodiment and returns to S201.

In the second embodiment described above, the data processing device 30 generates compound brush data by combining a plurality of converted brush data, and implements a ROP process equivalent to the ROP process using the operand P using the compound brush data as the source bitmap. Accordingly, the data processing device 30 of the second embodiment can more rapidly perform the ROP process than directing the ROP processor 51 to execute the ROP process using converted brush data for each section of the target region. This technique is particularly useful when using brush data a plurality of times (in other words, when the conversion procedure data indicates that brush data is to be used a plurality of times as the source data).

In the embodiments described above, the technique of the present invention corresponds to the ROP3 standard. However, the present invention may also be applied when the ROP processor 51 is configured for the ROP4 standard (as described next in a third embodiment of the present invention).

The next description will be made for explaining the third embodiment of the present invention. Unlike the ROP3 standard that expresses a ROP code with one byte (the range from "00" to "ff"), the ROP4 standard expresses ROP codes with two bytes (the range from "0000" to "ffff") including a high-order byte and a low-order byte, in addition to the brush data, source bitmap, and destination bitmap, the ROP4 standard uses mask data in logic calculations. Both the high-order byte and the low-order byte indicate a ROP code of the ROP3 standard. However, the high-order byte indicates that a ROP process corresponding to the ROP code of the ROP3 standard is to be executed in regions that the mask data is "0", while the low-order byte indicates that a ROP process corresponding to the ROP code in the ROP3 standard should be executed in regions having a mask data of "1".

Figure 15:
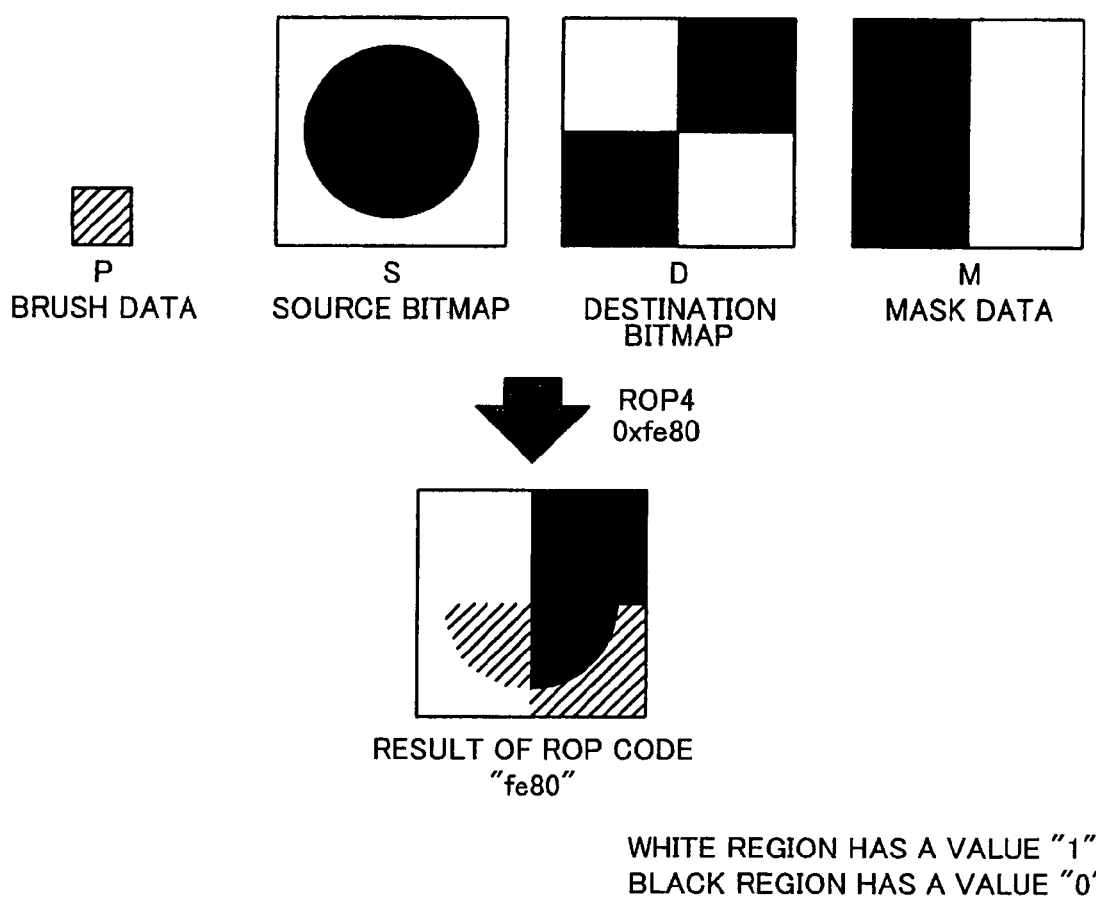
FIG. 15 shows the results of performing a ROP process for ROP code "fe80" in the ROP4 standard.

Referring to FIG. 15, as is clear through a comparison with FIG. 3, the results in FIG. 15 are obtained by executing the ROP process corresponding to ROP code "fe" of the ROP3 standard in regions having mask data "0" and executing a ROP process corresponding to ROP code "80" of the ROP3 standard in regions having a mask data of "1".

Hence, in the ROP conversion process using the ROP4 standard, the data processing device 30 divides the area being processed into a region with mask data of "0" and a region with mask data of "1" and can thereby execute ROP processes of the ROP3 standard on each region.

Figure 16:
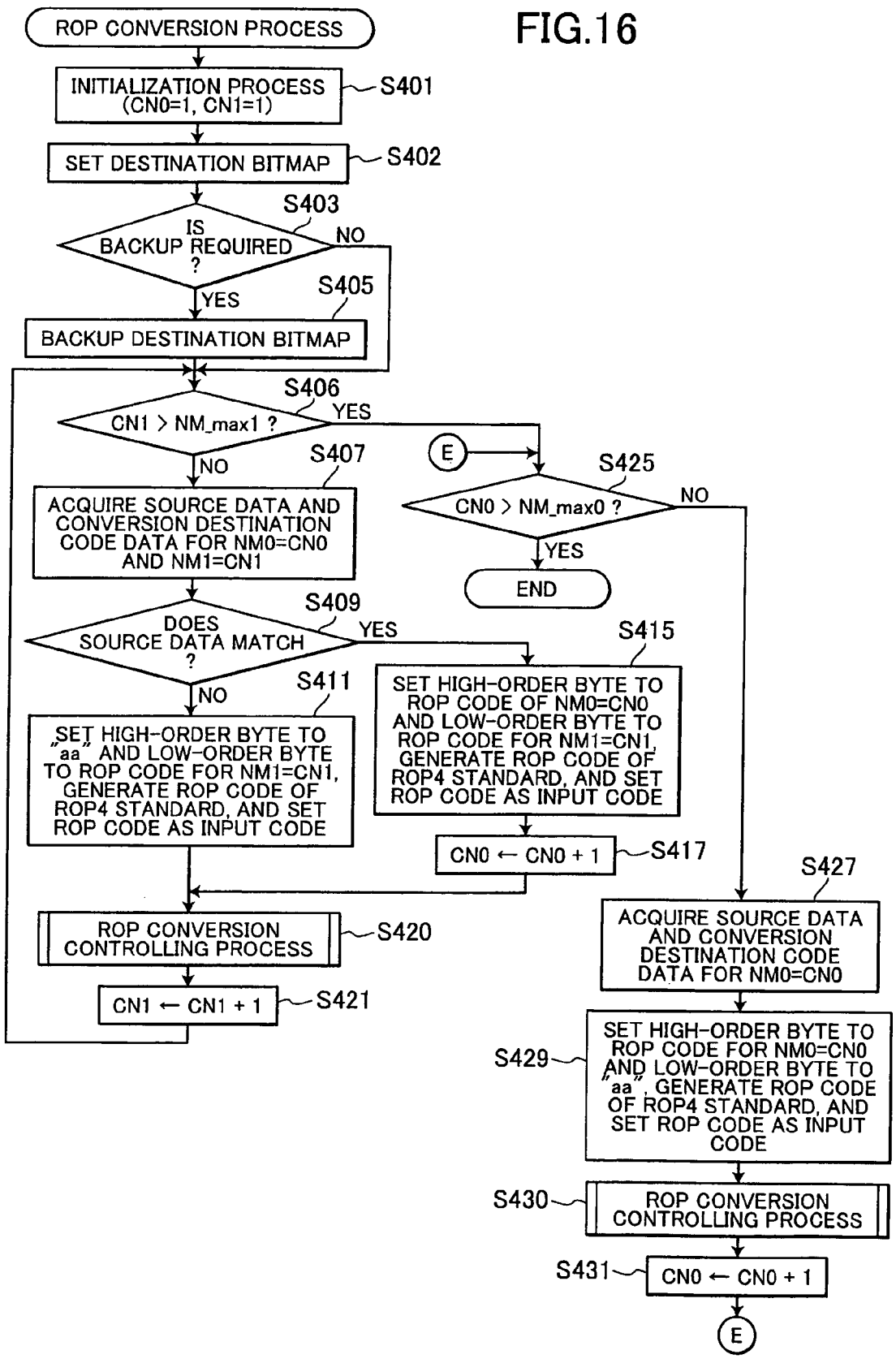
FIG. 16 is a flowchart illustrating steps in the ROP conversion process of a third embodiment that conforms to this ROP4 standard.
Figure 18:
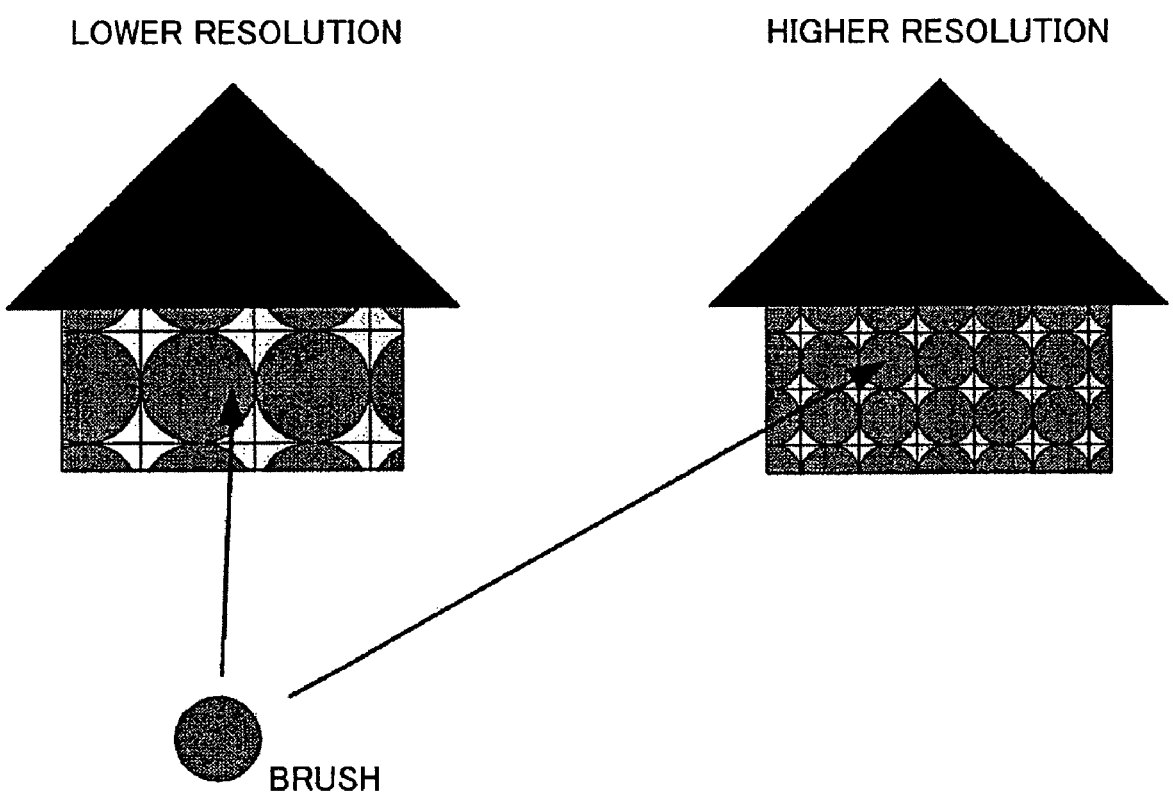
FIG. 18 is an explanatory diagram illustrating a conventional brush drawing under ROP using an image-forming device having different printing resolutions.

The ROP conversion process of the third embodiment uses the conversion table 55*a* of the ROP3 standard shown in FIG. 4. Referring to FIG. 16, at the beginning of this ROP conversion process in S401, the ROP process controller 55 performs an initialization process to initialize variables CN0 and CN1 to "1". In S402 the ROP process controller 55 inputs the destination bitmap specified with the ROP command into the ROP processor 51.

In S403 the ROP process controller 55 determines whether the inputted destination bitmap is required to be backed up. If the ROP process controller 55 determines that a backup is necessary (S403: YES), then in S405 the ROP process controller 55 saves the inputted destination bitmap in the RAM 35 as an original destination bitmap, and advances to S406. However, if the ROP process controller 55 determines that a backup is not required (S403: NO), then the ROP process controller 55 jumps to S406 without performing the process in S405.

In S406 the ROP process controller 55 determines whether the variable CN1 is greater than the maximum number NM_max1 of a process sequence code NM1 provided in the conversion procedure data corresponding to the ROP code in the low-order byte (ROP3) in the ROP code targeted for conversion (ROP4) that was inputted in the ROP process controller 55. In this embodiment, the conversion procedure data is for ROP code "e9" since the ROP code targeted for conversion is "58e9". Here, the process sequence code NM of the conversion procedure data corresponding to the ROP code in the low-order byte is represented by NM1, and the maximum number NM_max is represented by NM_max1. Similarly, the process sequence code NM of the conversion procedure data corresponding to the ROP code in the high-order byte is represented by NM0, while the maximum number NM_max is represented by NM_max0.

If the ROP process controller 55 determines that the variable CN1 is not greater than the maximum number NM_max1 of the process sequence code NM1 (S406: NO), then in S407 the ROP process controller 55 extracts from the conversion table 55*a* the source data and conversion destination code data for the process sequence code NM1=CN1 included in the conversion procedure data corresponding to the ROP code of the low-order byte (i.e., the conversion procedure data for ROP code "e9" in the case the ROP code targeted for conversion is "58e9"). The ROP process controller 55 also extracts from the conversion table 55*a* the source data and conversion destination code data for the process sequence code NM0=CN0 included in the conversion procedure data corresponding to the ROP code in the high-order byte (i.e., the conversion procedure data for ROP code "58").

In S409 the ROP process controller 55 determines whether the type of raster image data indicated by the source data for NM1=CN1 matches the type of raster image data indicated by the source data for NM0=CN0. If the ROP process controller 55 determines that the two types do not match (S409: NO), then in S411 the ROP process controller 55 sets the low-order byte to the ROP code indicated in the conversion destination code data of NM1=CN1 and sets the high-order byte to the value "aa". The ROP process controller 55 sets the ROP code to be inputted into the ROP processor 51 as a ROP code of the ROP4 standard generated by combining these two bytes, and sets the source data for NM1=CN1 to the source data used in the ROP conversion control process. Here, ROP code "aa" of the ROP3 standard indicates that no image processing is performed on the destination bitmap.

However, if the ROP process controller 55 determines in S409 that the type of raster image data indicated in the source data for NM1=CN1 matches the type of raster image data indicated by the source data for NM0=CN0 (S409: YES), then in S415 the ROP process controller 55 sets the low-order byte to the ROP code indicated in the conversion destination code data for NM1=CN1 and sets the high-order byte to the ROP code indicated in the conversion destination code data for NM0=CN0. The ROP process controller 55 sets the ROP code to be inputted into the ROP processor 51 to the ROP code of the ROP4 standard generated by combining these two bytes, and sets the source data for NM1=CN1 to the source data used in the ROP conversion control process. In S417 the ROP process controller 55 increments the variable CN0 by one.

After completing the process in S411 or after completing the process in S417, in S420 the ROP process controller 55 executes the ROP conversion control process shown in FIG. 9. However, instead of inputting the ROP code indicated in the conversion destination code data in S175, S177, and S180 as in the embodiments described above, the ROP process controller 55 inputs into the ROP processor 51 the ROP code generated and set in S411 or S415, in S175, S177, and S180. Further, the ROP process controller 55 makes the determinations in S171 and S173 based on the source data set in S411 or S415.

After completing the process in S420, in S421 the ROP process controller 55 increments the variable CN1 by one and returns to S406 to determine whether the value of the variable CN1 exceeds the maximum number NM_max1 for the process sequence code NM1. If the ROP process controller 55 determines that the variable CN1 does not exceed the maximum number NM_max1 (S406: NO), then the ROP process controller 55 executes the process of S407-S421 described above for the updated variable CN1.

However, if the ROP process controller 55 determines that the variable CN1 is greater than the maximum number NM_max1 (S406: YES), then in S425 the ROP process controller 55 determines whether the variable CN0 exceeds the maximum number NM_max0 for the process sequence code NM0. If the ROP process controller 55 determines that the variable CN0 does not exceed the maximum number NM_max0 (S425: NO), then in S427 the ROP process controller 55 extracts from the conversion table 55*a* the source data and conversion destination code data for the process sequence code NM0=CN0 provided in the conversion procedure data corresponding to the ROP code of the high-order byte (ROP3).

In S429 the ROP process controller 55 sets the high-order byte to the ROP code specified in the conversion destination code data for NM0=CN0, sets the low-order byte to the value "aa", and combines these bytes to generate a ROP code of the ROP4 standard. The ROP process controller 55 sets the ROP code to be inputted into the ROP processor 51 to this generated ROP code and sets the source data for the NM0=CN0 to the source data used in the ROP conversion control process. In S430 the ROP process controller 55 executes the ROP conversion control process of FIG. 9.

However, in S175, S177, and S180 of the ROP conversion control process executed in S430, the ROP process controller 55 inputs the ROP code that was generated and set in S429 into the ROP processor 51, rather than the ROP code indicated in the conversion destination code data. Further, determinations in S171 and S173 of this process are made based on the source data set in S429.

In S431 the ROP processor 51 increments the variable CN0 by one and returns to S425 to determine whether the variable CN0 exceeds the maximum number NM_max0 for the process sequence code NM0. If the ROP process controller 55 determines that the variable CN0 does not exceed the maximum number NM_max0 (S425: NO), then the ROP process controller 55 advances to S427. However, if the ROP process controller 55 determines that the variable CN0 does exceed the maximum number NM_max0 (S425: YES), then the ROP conversion process ends.

With the ROP conversion process of the third embodiment described above, it is possible to form a pattern (brush) in the destination bitmap of a size suitable for the printing resolution of the printer 10, even with an information processing device that performs ROP processes of the ROP4 standard. Hence, this ROP conversion process can prevent a pattern (brush) that is too small from being rendered on paper in image formation (printing) based on the destination bitmap due to the printing resolution of the printer 10 being too high. Similarly, the process can prevent a pattern (brush) that is too large from being rendered on the paper due to the printing resolution of the printer 10 being too low.

The image-processing device and program of the present invention are not limited to the embodiments, but may have various configurations. For example, while the conversion table 55a used for recording conversion procedure data is incorporated in the data processing device 30 in the embodiments described above, a computer program for analyzing operational expressions corresponding to the ROP code targeted for conversion and for deriving a conversion procedure may be incorporated in the data processing device 30 in place of the conversion table 55a.

Further, it is convenient to use existing engine functions provided in WINDOWS (registered trademark) or another operating system for enlarging or reducing the brush data.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An image-processing device comprising:

a raster operation unit that receives a first type of command, sets source data to raster image data having an arbitrary size in response to the first type of command, and executes a first image process corresponding to the received first type of command on target raster image data, the raster operation unit receiving a second type of command different from the first type of command, setting the source data to pattern image data having a specific size in response to the second type of command, and executing a second image process corresponding to the received second type of command on the target raster image data on the specific size of the pattern image data, thereby generating a pattern on the target raster image data;

a size modifying unit that determines modifying the specific size of the pattern image data;

a combination deriving unit that derives a combination of the first type of command implementing a target image process equivalent to the second image process; and a processing unit that sends the combination of the first type of command to the raster operation unit, and sets the source data to the pattern image data subjected by the size modifying unit, thereby instructing the raster operation unit to execute the target image process on the target raster image data.

2. The image-processing device according to claim 1, further comprising:

a storing unit that stores a plurality of combinations of the first type of command, each of the plurality of combinations implementing a target image process equivalent to the second image process, wherein the combination deriving unit selects a proper one of the plurality of combinations of the first type of command stored in the storing unit as the combination of the first type of command.

3. The image-processing device according to claim 1, wherein the raster operation unit sets the source data to the raster image data having an arbitrary size in response to the second type of command, the image-processing device further comprising:

a storing unit that stores a plurality of combinations of the first type of command for the second type of command, each of the plurality of combinations of the first type of command implementing a target image process equivalent to the second image process, and image data to be set as the source data, wherein the combination deriving unit selects a proper one of the plurality of combinations of the first type of command stored in the storing unit as the combination of the first type of command, and the corresponding image data to be set as the source data.

4. The image-processing device according to claim 1, wherein the raster operation unit executes the first image process on a part of the target raster image data having a size equivalent to a size of the source data in response to the first type of command; and the processing unit instructs the raster operation unit to execute the target image process on the target raster image data on the specific size basis.

5. The image-processing device according to claim 1, wherein the raster operation unit executes the first image process on a part of the target raster image data having a size equivalent to a size of the source data in response to the first type of command; the image-processing device further comprising:

an image combining unit that arranges plural pattern image data processed by the size modifying unit to generate compound-site image data having a size equivalent to a size of the target raster image data;

wherein the processing unit sets the source data to the compound image data instead of the pattern image data processed by the size modifying unit.

6. The image-processing device according to claim 1, wherein the first type of command is a raster operation code, and the second type of command is another raster operation code.

7. An image-processing device comprising:

a raster operation unit that receives a first type of command, sets source data to raster image data having an arbitrary size in response to the first type of command, and executes a first image process corresponding to the received first type of command on target raster image data, the raster operation unit receiving a second type of command different from the first type of command, setting the source data to pattern image data having a specific size in response to the second type of command, and executing a second image process corresponding to the received second type of command on the target raster image data on the specific size of the pattern image data, thereby generating a pattern on the target raster image data;

a determining unit that determines whether the pattern image data is required to modify the specific size on receiving the second type of command;

a size modifying unit that performs one of an enlarging process and a reducing process on the pattern image data if the determining unit determines that the pattern image data is required to modify the specific size;

a combination deriving unit that derives a combination of the first type of command implementing a target image process equivalent to the second image process if the determining unit determines that the pattern image data is required to modify the specific size; and a processing unit that sends the received second type of command to the raster operation unit to execute the second image process if the determining unit determines that the pattern image data is not required to modify the specific size, the processing unit sending the combination of the first type of command to the raster operation unit, setting the source data to the pattern image data processed by the size modifying unit, and instructing the raster operation unit to execute the target image process on the target raster image data if the determining unit determines that the pattern image data is required to modify the specific size.

8. The image-processing device according to claim 7, further comprising:

an image formation unit connectable to an image-forming device having a printing resolution, the image formation unit sending the target raster image data processed by the raster operation unit to the image forming device to cause the image forming device to form the processed target raster image data on an image forming medium with the printing resolution;

wherein the determining unit determines whether the pattern image data is required to modify the specific size, based on the printing resolution.

9. The image-processing device according to claim 8, further comprising:

a resolution determining unit that determines whether the printing resolution is greater than a reference resolution, wherein if the printing resolution is greater than the reference value, the determining unit determines that the pattern image data is required to modify the specific size, and the size modifying unit performs the enlarging process on the pattern image data.

10. The image-processing device according to claim 9, wherein if the pattern image data is monochrome, the determining unit determines the pattern image data is not required to modify the specific size, regardless of the printing resolution.

11. The image-processing device according to claim 8, further comprising:

a resolution determining unit that determines whether the printing resolution is less than a reference resolution, wherein if the printing resolution is less than a reference resolution, the determining unit determines that the pattern image data is required to modify the specific size, and the size modifying unit performs the reducing process on the pattern image data.

12. The image-processing device according to claim 11, wherein if the pattern image data is monochrome, the determining unit determines the pattern image data is not required to modify the specific size, regardless of the printing resolution.

13. The image-processing device according to claim 7, further comprising:

a storing unit that stores a plurality of combinations of the first type of command, each of the plurality of combinations implementing a target image process equivalent to the second image process, wherein the combination deriving unit selects a proper one of the plurality of combinations stored in the storing unit as the combination of the first type of command.

14. The image-processing device according to claim 7, wherein the raster operation unit sets the source data to the raster image data having the arbitrary size in response to the second type of command, the image-processing device further comprising:

a storing unit that stores a plurality of combinations of the first type of command for the second type of command, each of the plurality of combinations of the first type of command of implementing a target image process equivalent to the second image process, and image data to be set as the source data, wherein the combination deriving unit selects a proper one of the plurality of combinations stored in the storing unit as the combination of the first type of command, and the corresponding image data to be set as the source data.

15. The image-processing device according to claim 7, wherein the raster operation unit executes the first image process on a part of the target raster image data having a size equivalent to a size of the source data in response to the first type of command; and the processing unit instructs the raster operation unit to execute the target image process on the target raster image data on the specific size.

16. The image-processing device according to claim 7, wherein the raster operation unit executes the first image process on a part of the target raster image data having a size equivalent to a size of the source data in response to the first type of command;

the image-processing device further comprising:

image combining unit that arranges plural pattern image data processed by the size modifying unit to generate compound image data having a size equivalent to a size of the target raster image data;

wherein the processing unit sets the source data to the compound image data instead of the pattern image data processed by the size modifying unit.

17. The image-processing device according to claim 7, wherein the first type of command is a raster operation code, and the second type of command is another raster operation code.

18. A non-transitory computer readable storage medium storing a program executed by a computer equivalent to the raster operation unit, the size modifying unit, the combination deriving unit, and the processing unit of the image-processing device according to claim 1.

19. A non-transitory computer readable storage medium storing, a program executed by a computer equivalent to the raster operation unit, the determining unit, the size modifying unit, the combination deriving unit, and the processing unit of the image-processing device according to claim 7.

* * * * *